(12) United States Patent
Bailey et al.

(10) Patent No.: US 9,530,320 B2
(45) Date of Patent: Dec. 27, 2016

(54) FLIGHT OBJECT COMMUNICATIONS SYSTEM

(71) Applicant: The Boeing Company, Chicago, IL (US)

(72) Inventors: Louis J. Bailey, Covington, WA (US); Ryan D. Hale, Kent, WA (US)

(73) Assignee: The Boeing Company, Chicago, IL (US)

( * ) Notice: Subject to any disclaimer, the term of this patent is extended or adjusted under 35 U.S.C. 154(b) by 74 days.

(21) Appl. No.: 14/502,942

(22) Filed: Sep. 30, 2014

(65) Prior Publication Data

US 2016/0093219 A1    Mar. 31, 2016

(51) Int. Cl.
G06F 19/00    (2011.01)
G06G 7/70    (2006.01)
G06G 7/76    (2006.01)
G08G 5/00    (2006.01)

(52) U.S. Cl.
CPC .......... G08G 5/0039 (2013.01); G08G 5/0013 (2013.01); G08G 5/0021 (2013.01); G08G 5/0026 (2013.01); G08G 5/0034 (2013.01); G08G 5/0091 (2013.01)

(58) Field of Classification Search
CPC ..... G08G 5/0017; G08G 5/004; G08G 5/0039
USPC ................................. 701/1, 3, 120
See application file for complete search history.

(56) References Cited

U.S. PATENT DOCUMENTS

| | | | |
|---|---|---|---|
| 5,892,462 A | 4/1999 | Tran | |
| 6,076,039 A | 6/2000 | Kabel et al. | |
| 6,289,277 B1 | 9/2001 | Feyereisen et al. | |
| 6,700,482 B2 | 3/2004 | Ververs et al. | |
| 6,707,475 B1 | 3/2004 | Snyder | |
| 6,744,382 B1 | 6/2004 | Lapis et al. | |
| 7,194,353 B1 | 3/2007 | Baldwin et al. | |
| 7,418,319 B2 * | 8/2008 | Chen ................ | G01C 23/00 701/14 |
| 7,546,206 B1 | 6/2009 | Miller et al. | |
| 7,546,207 B2 | 6/2009 | Nix et al. | |
| 7,623,957 B2 | 11/2009 | Bui et al. | |
| 8,244,418 B1 | 8/2012 | Frank et al. | |
| 8,467,919 B2 | 6/2013 | Klooster | |
| 2002/0039072 A1 | 4/2002 | Gremmert et al. | |
| 2003/0048203 A1 | 3/2003 | Clary et al. | |
| 2003/0122701 A1 | 7/2003 | Tran | |
| 2004/0183695 A1 | 9/2004 | Ruokangas et al. | |
| 2005/0049762 A1 | 3/2005 | Dwyer | |
| 2007/0129855 A1 | 6/2007 | Coulmeau | |
| 2007/0208465 A1 | 9/2007 | Gremmert | |
| 2007/0288156 A1 | 12/2007 | Neff et al. | |
| 2008/0023587 A1 | 1/2008 | Head et al. | |

(Continued)

OTHER PUBLICATIONS

European Patent Application No. 15186562.3; Extended Search Report; dated Jul. 26, 2016; 10 pages.

Primary Examiner — Jaime Figueroa
(74) Attorney, Agent, or Firm — Baker & Hostetler LLP

(57) ABSTRACT

Systems and methods for processing aircraft flight information and flight plan information are described. Specific techniques are described for managing flight data in real time, sharing flight data between a plurality of systems, dynamically managing flight information, generating flight plan information, providing flight plan information to a user, and closing flight plan discontinuities.

18 Claims, 14 Drawing Sheets

(56) References Cited

U.S. PATENT DOCUMENTS

| | | |
|---|---|---|
| 2008/0059058 A1 | 3/2008 | Caillaud et al. |
| 2008/0071434 A1 | 3/2008 | Fortier et al. |
| 2008/0167885 A1 | 7/2008 | Judd et al. |
| 2008/0309518 A1 | 12/2008 | Aung |
| 2009/0150012 A1 | 6/2009 | Agam et al. |
| 2009/0157237 A1 | 6/2009 | Bitar et al. |
| 2009/0319100 A1 | 12/2009 | Kale et al. |
| 2010/0039310 A1 | 2/2010 | Smith et al. |
| 2010/0152924 A1 | 6/2010 | Pandit et al. |
| 2010/0191458 A1* | 7/2010 | Baker .................... G01C 21/00 701/533 |
| 2010/0191754 A1* | 7/2010 | Baker ................ G06Q 10/109 707/758 |
| 2010/0281411 A1* | 11/2010 | Baker ................ G08G 5/0034 715/769 |
| 2010/0315265 A1 | 12/2010 | Smith et al. |
| 2011/0054718 A1* | 3/2011 | Bailey .................... G01W 1/08 701/3 |
| 2011/0137998 A1 | 6/2011 | Judd et al. |
| 2011/0196598 A1 | 8/2011 | Feyereisen et al. |
| 2011/0199239 A1 | 8/2011 | Lutz et al. |
| 2012/0022778 A1 | 1/2012 | Mishra |
| 2012/0143405 A1* | 6/2012 | Cabos .................... G07C 5/008 701/3 |
| 2012/0191332 A1 | 7/2012 | Sawhill et al. |
| 2013/0027226 A1 | 1/2013 | Cabos |
| 2013/0046422 A1* | 2/2013 | Cabos ................ G08G 5/0034 701/3 |
| 2013/0080043 A1 | 3/2013 | Ballin et al. |
| 2013/0085661 A1* | 4/2013 | Chan .................... G05D 1/104 701/122 |
| 2013/0085672 A1 | 4/2013 | Stewart et al. |
| 2013/0173321 A1 | 7/2013 | Johnson |
| 2013/0211701 A1 | 8/2013 | Baker et al. |
| 2013/0226452 A1 | 8/2013 | Watts |
| 2013/0345905 A1 | 12/2013 | Parthasarathy |

* cited by examiner

Lateral Profile

Vertical Profile

Speed Profile

FLIGHT OBJECT COMMUNICATIONS SYSTEM

CROSS REFERENCE TO RELATED APPLICATIONS

This application is related by subject matter to the following commonly assigned applications: U.S. patent application Ser. No. 14/502,823, entitled "AUTOMATED FLIGHT OBJECT PROCEDURE SELECTION SYSTEM," U.S. patent application Ser. No. 14/503,013, entitled "FLIGHT ANALOGOUS AND PROJECTION SYSTEM," U.S. patent application Ser. No. 14/503,123, entitled "AIRCRAFT PERFORMANCE PREDICTIONS," U.S. patent application Ser. No. 14/503,179, entitled "AUTOMATIC REAL-TIME FLIGHT PLAN UPDATES," and U.S. patent application Ser. No. 14/503,236, entitled "FLIGHT PATH DISCONTINUITIES," all filed on Sep. 30, 2014, the entirety of which are hereby incorporated by reference.

BACKGROUND

The planning of a commercial airline's flight plan is a complex and dynamic process that must consider more than delivering passengers from point A to B. The planning of a commercial flight begins many hours and days before the flight actually departs. The process of planning, replanning, and updating a flight plan has many complexities that must be weighed and balanced, to name a few: the airline business case, environmental (i.e., noise, emission), airspace optimization, weather, aircraft performance, passenger connections, medical emergencies, and alternatives. Each of these complexities are considerations that must be continuously monitored, evaluated, and balanced for a multitude of actors (e.g., pilot, dispatcher, air traffic controllers) in the system. These considerations must be incorporated when the flight plan is planned or replanned. If the flight has already commenced, the flight plan is updated.

The flight plan is often viewed as a lengthy document that indicates an aircraft's planned and alternate flight route and includes information such as departure and arrival points, estimated time enroute, weather, notices to airmen (NOTAMs), and type of flight. The large number of considerations that must be weighed and balanced, in a real-time iterative process, mean that the generation and updating of the flight plan is a complex and labor intensive process.

Additional complexity is introduced when the flight plan must be communicated, coordinated, and collaborated with the multiple system actors. The flight plan must also meet domestic and international requirements. This process is time consuming, prone to errors, and labor intensive.

Standardized training, computers, and systems of computers have helped minimize errors, reduced the time to generate and update a flight plan, and diminished communication, coordination, and collaboration efforts and cost. Nevertheless, the dynamic nature of the flight information that impact a flight plan makes it difficult to fully optimize the generation, exchange, and update of a flight plan in a timely and efficient manner prior to and after departure.

Computers, or a system of computers, introduce its own layer of complexity and associated cost. Each actor in the flight plan development process now becomes a user with the system of computers providing the flight plan. The flight plan and flight information must now be exchanged, coordinated, and acknowledged between all applicable systems, where each system represents its respective user. As an example, air traffic controllers receive and view the flight plan information with current status (i.e., positional information) on a radar scope type of display. In this example, the flight plan information displayed for the controller is from both airborne and ground systems. In yet another example, the pilot views the flight plan and flight information on a different system, e.g., the Flight Management Computer (FMC) or the navigation display (ND). Each system (i.e., radar display or FMC) has its own limitations and method of communicating and processing the flight plan and flight information.

In an effort to further reduce complexities to the user(s) and improve operational efficiency, automated flight management and decision support tools, along with computers, are needed. However, due to the dynamic nature of the flight plan and flight information, the automated tools should also be dynamic. Dynamic Automated Tools (DAT) would facilitate the optimization and dynamic generation and updating of flight plan, flight information, flight efficiency, flight optimization, post flight analysis and flight efficiency advisories. DAT is needed to weigh and balance the multitude of considerations as well as collaborate and exchange the dynamic flight information in an optimized (e.g., timely and cost efficient) manner across multiple systems.

SUMMARY

The features, functions, and advantages that have been discussed can be achieved independently in various embodiments or combined in yet other embodiments, further details of which can be seen with reference to the following description and drawings.

The subject matter disclosed herein includes systems and methods for processing airline, air traffic control, and aircraft flight information in real-time, preflight, and post flight.

The subject matter disclosed herein includes systems and methods for dynamically managing flight information, sharing flight information between a plurality of systems, generating and updating flight information, predicting flight information, projecting flight information, and providing flight information to a subscriber. Flight information is any information associated with a flight. Flight information is historical, real-time, predicted, and projected flight data. Flight information is processed in preflight, real-time, and post flight. Examples of flight information include, but are not limited to, ATC flight plans, speed profiles, weather, time, fuel, fuel categories, user notes (e.g., pilot notes, air traffic controller notes), aircraft performance parameters, surveillance data, subscriber preferences, NOTAMS, loadsheets, clearances, status messages, FMC flight plans and Operational Flight Plans (OFP). The result of the amalgamated flight information is a flight object.

A method of generating flight information can include receiving data associated with a flight into an object(s) on a computing device configured to generate and modify a flight object. Flight information is computed and extracted from the flight object(s) and rendered for viewing. The flight information is distributed across one or multiple systems. Flight information received as a flight plan entry contains flight departure and arrival procedures (e.g., VFR, IFR, Airport), routing preferences, aircraft performance and flight constraints (e.g., trip cost, time, fuel). The flight trajectory is determined from the flight plan contained in the flight object.

A flight plan and trajectory is optimized for cost, time, fuel, passenger comfort, airspace efficiency, and safety (i.e., weather, terrain). Optimization algorithms prioritize the optimization preferences of one or multiple categories (i.e., cost, time fuel, passenger comfort, airspace efficiency, safety) for an integrated solution. The optimized solutions can be dynamically determined based on real-time assessment of the current, historical, probable and predicted flight information. Optimization and efficiency advisories are provided for the departure, arrival, and approach lateral and vertical route, business constraints (i.e., crew cost, crew rest, flight schedule, connecting passenger), fuel loading, and time profiles. The optimized flight information is rendered for viewing.

A method of communicating flight information between a plurality of systems is performed as a flight object. Individual flight information parameters can also be communicated. When multiple parameters of flight information need to be communicated it is advantageous to use a flight object. Subscribers may impose limitations to communicate the flight information. Therefore, the method to communicate the flight information must be dynamic for the connection type and throughput. The flight object and flight object manager controls receiving, transmitting, and allowing access to flight information indicative to one or more flights.

Flight information is received or retrieved. The flight information is processed to determine if it is new or a modification. New flight information is processed to generate a new flight object. Updated flight information is processed to determine if the data is a duplication or an update to existing flight information. A flight can have more than one flight object. An example of a situation where a flight can have more than one flight object associated to it would be a second flight with the flight information weather that can be correlated to the first flight.

A method to correlate the flight information from a second or more flights to the first flight. The correlation of a flight object to another flight object is performed based on a holistic evaluation of each flight information parameter against one or more flight information categories of the second flight. This method enables multiple flight objects associated to a flight for an amalgamated embodiment of the first flight. A flight object can have multiple flight objects associated or embedded in the flight object, Managing flight information involves real-time synchronization and communication across multiple systems. The flight information and the flight object are communicated as flight messages. Each system has its own unique characteristics of interface, bandwidth and storage limitations, and messaging formats. The unique characteristics must be overcome to synchronize the flight information across multiple systems.

Flight messages, hereafter referred to as "messages," are representative of the updated flight objects, or flight information, and are generated so as to be compatible with subscriber systems. The generated messages are communicated to the subscriber systems across the one or more networks.

Flight objects and information, and optimized solutions of the flight information and object, can be projected to an active, inactive, secondary, or alternate flight plan. The user is also provided the option to apply analogous flight history data to a flight plan, thus allowing the user to observe a projected outcome. Furthermore, the user is allowed to manipulate or tailor the flight history data to observe hypothetical projections.

The use of analogous data to provide "what if" flight plan scenario manipulations is useful because real-time data is typically not available that is used for planning a flight's trajectory, fuel loading, departure time, and determining enroute weather.

In at least one embodiment, the flight object management function includes functionality that allows an approved user to view and select one or more procedures applicable to a flight. The list of applicable procedures includes the most efficient route, which is automatically determined based on currently available information including the total current aerodrome environment. The automation used to select the most efficient route considers course to the destination, time, fuel, airline costs, distance, weather, direct routing and back courses. However, the most efficient route varies depending on the currency and probability of real-time and forecasted flight and aerodrome information. The determination of the efficient route also takes into account the selected timeframe so as to determine the most advantageous time-based route. The efficient route accounts for the total current aerodrome environment as well as the business and operational considerations of the airline, air traffic controller, weather, environment, terrain, and regulatory restrictions.

In at least one embodiment, a system and method can include receiving data indicative of one or more flight objects. Flight information is extracted from the flight objects and rendered for viewing. A flight plan entry associated with the flight information is received. Procedures are searched and optimized departure, arrival, and approach routing information is identified. The optimized routing information is rendered for viewing.

In at least one embodiment, the flight object management function includes functionality that allows an authorized user to dynamically make changes to a flight plan and communicate the changes across multiple or local systems and subscribers. The changes are synchronized across the multiple or local systems. In order to accomplish this synchronization, messages are automatically generated for each of the systems' and subscriber's communication protocols. The systems and subscribers include the on-board flight management system, mobile devices, local agencies, and ATC. The changes, their status, and associated information can be viewed in real-time. By providing a way to update flight plans from heterogeneous systems, dynamic updates to flight plans from various sources can be accommodated in an efficient manner.

In one embodiment, a system and method of communicating flight data between a plurality of systems can include receiving data indicative of flight objects. Flight information is extracted from the flight objects and rendered for viewing and editing along with real time airspace environment data pertaining to the flight information. Modifications to the flight information are received and updates to the flight objects are generated. Messages representative of the updated flight objects are generated that are compatible with subscriber systems. The generated messages are communicated to the subscriber systems across the one or more networks.

In some embodiments, the flight object management function includes functionality that allows an approved user (pilot, dispatcher, air traffic controller) to view a graphical depiction of an active flight plan in conjunction with multiple flight plans and flight histories. In one embodiment, specific flight history data, past flight plan, or flight history most related to the active flight plan is highlighted or annunciated. Various options are configurable by the user. For example, options can be configured by similar route, speeds, altitude, aircraft type, date range, origin, destination, departure time, arrival time, tail number, pilot's name, or flight number of one or more airline operators. In one embodiment, all data stored in the flight history database are searched, and the flights or flight data most analogous to the active flight plan are identified.

In one embodiment, a system and method of generating projected flight information can include inputting flight objects to a computing device configured with a flight object management function. Flight information can be derived, manually entered or sensed data. Flight information optimization and efficient computations are performed, and the results and active flight information is rendered for viewing. Flight history data is identified that is analogous to the active flight information. A selection of a portion of the analogous flight history data is received, and based on the selected analogous flight history data, a projection of the analogous flight history data is projected on the active flight information.

In some embodiments, the flight object management function includes functionality that generates aircraft performance predictions based on real-time flight information, manually entered flight information, historical flight information, probabilities, current predictions, and pilots' notes. Based on this information, new optimization opportunities are identified and updated flight predictions are generated. Examples of predictions include new or updated departure times, probability of holds at a waypoint, forecasted and in-situ weather, airspace delays, probable approach procedures or runways, and other performance related predictions. The predictions are accompanied by a probability distribution that indicates the expected likelihood of the prediction. Additionally, flight history data (including pilot notes) is used to generate new or updated flight plan and aircraft performance predictions such as fuel loads, fuel burn rates, cost index, flight times, hold times, arrival times, flight path updates, step climbs and other performance related predictions and their probabilities.

In one embodiment, a system and method of generating predicted flight plan information can include accessing one or more flight objects on a computing device configured with a flight object management function. The one or more flight objects are associated with a planned flight. A request for flight information pertaining to the planned flight is received. Flight information pertaining to the planned flight and associated airspace environment is determined, and event probability and predictions for the planned flight is generated based on the associated and correlated flight information.

In some implementations, the flight object management function includes functionality that captures and compiles current and predicted flight information in real-time and automatically makes that data available to the user's device to update the original filed flight plan. The user's device can be a mobile computing device executing the efficiency and operational flight object system. The updated flight plan data is sent to the FMC via a ground or airborne service using one of a plurality of communications channels that is manually selected by the user or automatically selected by the user's device based on selection criteria. For example, the user's device can send the data through the onboard network system (ONS) to the internet, directly via the internet or an intranet, or other physical or wireless connection (USB, BLUETOOTH, etc.).

In one embodiment, a system and method of providing flight plan information to a user can include receiving a flight object by a computing device configured with an efficiency and operational flight object system. The flight object is processed to identify flight plan information pertaining to a planned flight associated with an aircraft. The identified flight plan information is rendered on a user interface of the computing device. Real time flight information pertaining to the aircraft is received as the aircraft conducts the planned flight. Based on the real time flight information, the flight plan information contained in the flight object is updated. The updated flight plan information is provided to the computing device for rendering on the computing device.

In some embodiments, the efficiency and operational flight object system includes functionality that automatically generates flight plans, secondary, or alternate flight plans for a subscriber, where the generated flight plans are free of discontinuities. The efficiency and operational flight object system determines if and where discontinuities exist in a flight plan. If discontinuities exist, the discontinuities are automatically removed and a discontinuity-free flight plan is generated based on the communication protocol for the subscriber. The efficiency and operational flight object system can also add discontinuities in some instances, for example in scenarios involving ATC restrictions, minimize pilot training, or to place emphasis an area requiring additional pilot focus. In some embodiments, discontinuities may be added and remove in the same flight plan. For example, a configuration may require adding discontinuities for the departure procedures, but removing all discontinuities from the arrival procedures.

In one embodiment, a system and method of closing flight plan discontinuities can include accessing one or more flight objects on a computing device configured with an efficiency and operational flight object system. A flight plan is identified in the one or more flight objects. The flight plan is associated with a first subscriber. An indication of a second subscriber for the flight plan is received. Using the flight plan, flight information that is free of discontinuities is generated, based at least in part on requirements associated with the second subscriber.

DETAILED DESCRIPTION

Figure 1:
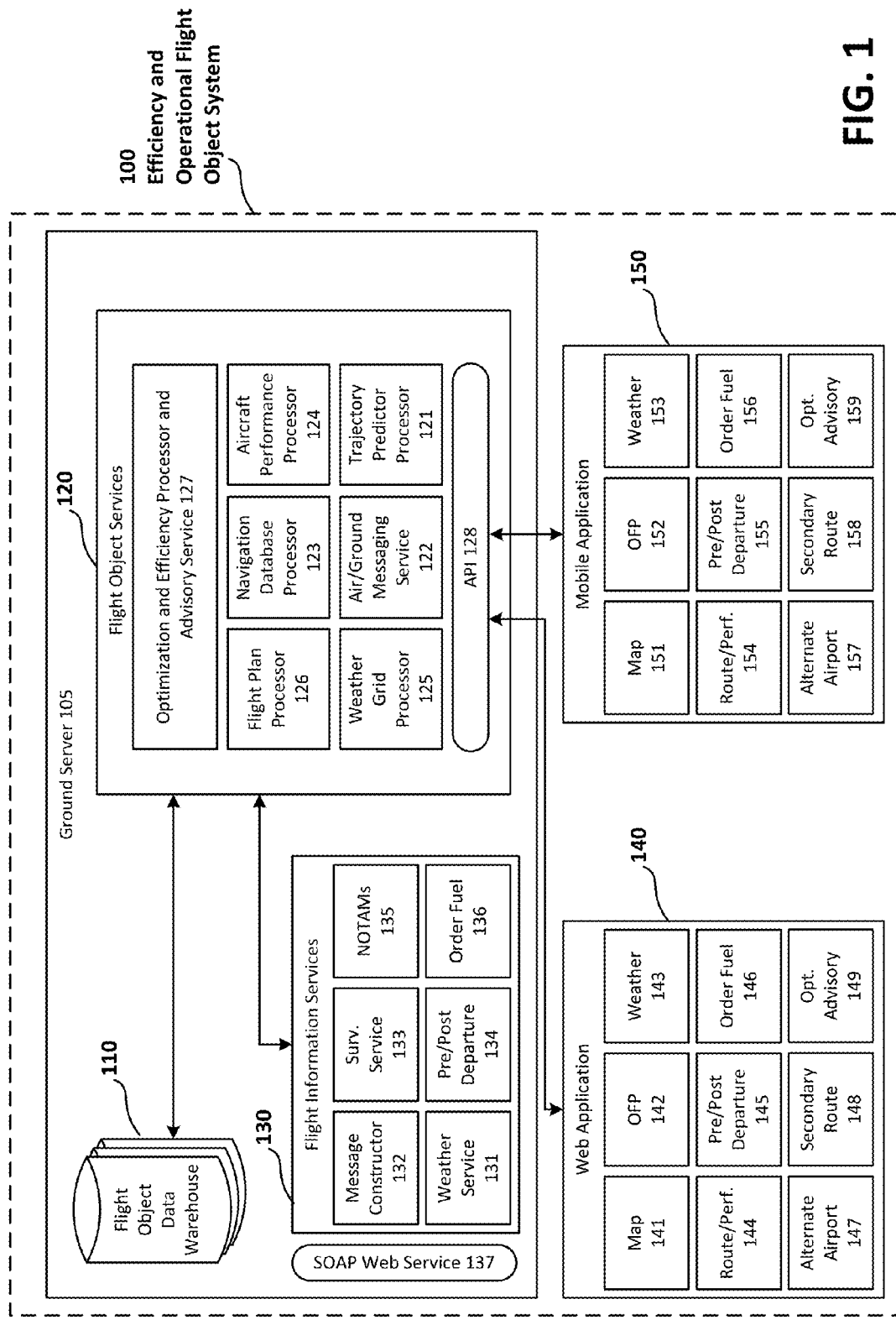
FIG. 1 depicts an example of an efficiency and operational flight object system.

One or more embodiments described herein relate generally to the processing of flight information. Flight information pertains to information related to one or more flights. Flight information is historical, real-time, actual, predicted, and projected flight data. Flight information is processed in preflight, in-flight and post flight in real-time and post processing. Examples of flight information include, but are not limited to, ATC flight plan, FMC flight plan, historical flight actual information, speed profiles, weather, time, fuel, fuel categories, pilot notes, air traffic controller notes, aircraft performance parameters, surveillance data, subscriber preferences, NOTAMS, loadsheets, clearances, status messages, advisories, voice transcripts, pictures or images, FMC prediction and intent data and the dispatched Operational Flight Plans (OFP). The result of the amalgamated flight information is a flight object. Flight information can be received from either a ground source or from an aircraft in the form of a flight message. The air and ground source can operate using its own unique format or standard industry format specification.

Planning flight operations typically involve the generation and use of flight plans. Flight plans may be used to document information such as departure and arrival points, estimated time enroute, weather, various waypoints the aircraft must traverse enroute, information pertaining to those waypoints such as actual or estimated altitude and speed of the aircraft at those waypoints, information relating to legs of the flight between those waypoints, and aircraft predicted performance.

Flight plans may be used to document basic information such as departure and arrival points, estimated time enroute, various waypoints that the aircraft must traverse enroute, information pertaining to those waypoints, such as actual or estimated altitude and speed of the aircraft at those waypoints, information relating to legs of the flight between those waypoints, and aircraft predicted performance. This type of flight plan may be used to construct a flight trajectory including the various legs of the flight, which are connected to the various waypoints along the route. Flight plans may be used to construct a flight trajectory including the various legs of the flight which are connected to various waypoints along the route. The flight trajectory may include a lateral trajectory defined in the horizontal plane and a vertical trajectory defined in the vertical plane. The flight trajectory may also include the element of time across the horizontal and vertical planes. Flight intent information generally refers to the future flight trajectory of an aircraft expressed as a four-dimensional profile until destination. Flight prediction information also relates to the future flight trajectory, however it is generally limited to a pilot's perspective of information pertinent to the flight. Flight intent information may contain additional flight parameters required by ground systems. Ground systems would use the additional information to perform functions such as the issuance of speed or time clearances.

Various sources may be used for generation of a flight route, flight plan, flight intent and flight trajectory. Some the sources may include the aircraft, air traffic control, an airline operations center, a flight management computer, or another ground source. Any particular source of flight information may represent a particular view of the overall flight and aircraft state of a particular aircraft. As an example, an aircraft downlink message and a flight message from an Air Navigation Service Provider (ANSP) may provide a view of a flight or a set of flight information describing the flight route, plan, intent, or trajectory of a flight from the perspective of the ANSP. Each message, from different sources, may reflect the current conditions known to that particular system (i.e., the sensed, entered and calculated flight information data such as flight plan, aircraft state, etc.). In yet another example, if surface winds change at the destination, thus the landing runway changes, the aircraft downlink message may not reflect this change until the information has been entered in the applicable systems for that particular flight.

In at least one embodiment, a flight information object or a flight object is a software container of information pertaining to a particular flight. For example, a flight information object can be a data structure comprising flight data fields and methods for their interactions. The flight information object can include a plurality of fields containing flight information, such as elements of flight plans, flight routes, flight trajectories, flight messages, aircraft state data (such as weight, center of gravity, fuel remaining, etc.) and environmental information. Environmental information pertains to weather information for a flight. Weather information includes wind speed/direction (as well as vertical component), pressure, energy indexes, temperature, moisture (humidity, snow, rain, hail), confidence indexes, quality indexes and location and time of said weather. Environmental information also includes information regarding turbulence, location of the tropopause, noise, particulates or icing levels. Flight information received as a flight plan entry may contain flight departure and arrival procedures (e.g., VFR, IFR, Airport), routing preferences, aircraft performance and flight constraints (e.g., trip cost, time, fuel). The flight trajectory is determined from the flight plan contained in the flight object.

In another embodiment, the flight information object can include one or more pointers, or indexes to the locations of the raw or actual flight information. This is advantageous when storing, retrieving, distributing and processing large quantities of flight information.

In at least one embodiment, a ground-based system for receiving a flight message from a ground source or downlinked from an aircraft includes flight plan/route processing functions programmed to update the flight plan/route in the received flight message, based at least in part on environmental information, and then uplink a flight message containing the updated flight plan/route. In one example, a process or methodology includes receiving a flight information message from an aircraft or a ground source (e.g., an operations center). An aircraft or an operations center may transmit the flight plan/route in a variety of formats using a variety of methods. For example, a flight plan/route message can be transmitted from an aircraft via the Aircraft Communications Addressing and Reporting System (ACARS), Aeronautical Telecommunication Network (ATN), internet, or some other aircraft datalink technology (e.g., broadband satellite IP). From air or ground sources, the message can be transmitted and received in any unique format specified by the user (e.g., an Aeronautical Operational Control datalink message type) or in a standardized ground messaging format (e.g., Type B).

In an example, a process in accordance with one embodiment, one or more flight information messages relating to a particular flight is received from a single source or from multiple sources. A flight message contains one or multiple pieces of information about a flight. When a flight message is received, a respective local flight information object is instantiated and the flight message is stored in a respective local flight information object. A plurality of local flight information objects is generated and stored in computer memory for a particular flight. After a flight message has been received and stored in a local flight information object, the flight message is parsed into data fields. The parsed data is also stored in the respective local flight information object.

System security interface functions can also be provided for input validity and access authentication. The system security interface functions can be part of a federated/distributed security scheme for functions, subsystems, devices of the system employing the flight data functions described herein. If the input is invalid or access is not authorized, access to data and functions may not be allowed.

Environmental information for the route between the departure gate and arrival gate, including information about forecasted and in-situ weather for the various waypoints along the route, can affect a flight trajectory. For example, if weather is forecasted for a particular waypoint along the route of the flight plan, certain predictions for the flight path may be affected, such as speed, fuel consumption, and time enroute. Weather information includes, for example, information collected from air and ground weather sources, information about weather local to a particular operation center, forecasted weather information for a number of locations. Aircraft weather information includes weather directly reported or derived from a number of aircraft.

Additionally, revision of a flight plan includes deleting or adding waypoints, modifying the position of waypoints, or modifying the characteristics pertaining to the waypoints or legs between the waypoints, such as the mannerism in which the aircraft maneuvers, aircraft speed, time of arrival at the waypoint, or altitude. The characteristics for various waypoints or legs, segments joined by waypoints or fixes, further examples include weather bands. A weather band is a collection of environmental information for a specific or series of spatial points, such as a specific altitude or a series of three- or four-dimensional points in space and time.

Airline operation centers and air traffic control centers identify and send information such as weather bands to an aircraft for use in determining how the weather information affects flight trajectory calculations. For example, the weather bands identified can be based on current or predicted weather, flight predictions, flight intent or flight plans, or may be default weather bands non-specific to a particular flight trajectory. Actual weather can impact a predicted flight trajectory if the actual weather differs from the predicted weather used to calculate the predicted flight trajectory. Additionally, different factors enroute can cause an aircrew to modify the flight plan, and the environmental information from the operation or control center, loaded during preflight, may no longer be accurate or up-to-date for the modified flight plan. Inaccurate or dated environmental information can result in inefficiencies for flight operations, such as an increase in fuel consumption and emissions or delay in flight time, for example.

Users associated with an aircraft or flight can request a new flight plan and/or new environmental information from a operations center or air traffic control center. The downlinked request can be accompanied or followed by current flight route or flight plan information for that aircraft. The downlinked flight route or flight plan information can include items such as: a list of waypoints, instrument departure procedures, arrival and departure transitions, airways, Standard Terminal Arrival Routes (STAR), approach procedures, fixes and leg types.

In general, when a flight plan is received, a user such as a pilot typically evaluates the information contained in the flight plan, accesses relevant and contingent information as necessary, updates the plan flight as needed or desired, receives updates to the flight plan as updates become available, and provides updates to the flight plan to the necessary parties. In various embodiments described herein, a tool is described that allows pilots to evaluate, view, organize, update, and manipulate the flight plan in real time, and annotate, communicate and synchronize the changes across multiple or local systems, among other functions. The tool is generally referred to herein as an efficiency and operational flight object system that can be implemented on one or more computing devices. When flight plans are downloaded or uploaded, there may be delays and costs associated with the uplink and downlink service as well as time and effort for the pilot to obtain and process the information. A tool such as the efficiency and operational flight object system may be provided to allow a user such as a pilot to quickly and efficiently access, evaluate, update, and transmit flight objects such as flight plans and flight efficiency advisories.

In one example embodiment, a flight plan can be downloaded to a mobile device that implements or connects to the efficiency and operational flight object system and accesses a history for a particular flight and other available flight information such as notes from previous flights. The device is configured to receive advisories and receive information from other sources using various lines of communication. The user can modify the flight plan based on the available historical and real-time flight information. After the flight plan is modified, the modified flight plan is uplinked to a service provider, which can be transmitted to the airline operations center (AOC) and sent to the Flight Management Computer (FMC) or other on-board systems. The most recent flight plan and a history of the updated plans are maintained and can be made available for other users of the system.

By allowing access to flight plan information, using computing devices such a mobile device, flight planning activities can be implemented in an efficient manner while allowing for mobile use and collaboration. For example, some or all of the functionality described herein with reference to processing of flight objects and associated flight information can be provided in the efficiency and operational flight object system and installed on a mobile device. The mobile device can initiate the plan/route processing function in response to a prompt by the user, the FMC, or other input source. A mobile device implementing the efficiency and operational flight object system is referred to herein as a computing device that performs flight information processing, flight planning processing, or efficiency advisory processing device.

In various embodiments and examples described herein, the efficiency and operational flight object system can be implemented in one or more computing devices. The efficiency and operational flight object system is configured to receive incoming flight information messages and process or generate a flight information object. The flight plan/route processing function is configured to receive flight information messages that relate to the same flight from multiple sources. The computing devices that execute the flight plan/route processing function can comprise a single processor or multiple processors for processing flight information. In at least one embodiment, the flight plan/route processing can be implemented in a portable or mobile computing device such as a tablet or laptop.

In at least one embodiment, the efficiency and operational flight object system can include sub-functions that are separate processes running on different computers, networks or on one or more processors within the same computer. The computers can include a combination of mobile devices such as tablets, and one or more servers.

Flight information messages and flight information objects can be received and updated in real time. As used herein, the term "real time" refers to an action that is performed at a current time or at the next available time, as opposed to being saved for action at a planned future or later time. A real time action may be performed with currently available information, or with the most recently available information.

The efficiency and operational flight object system is configured to access information available from a number of databases, such as weather information from a ground or air source, aircraft current state data, and aircraft performance databases. The flight plan/route processing function is also configured to receive information directly from a number of aircraft and/or operation centers, such as the aircraft, an operation center, and ATC, among others.

The efficiency and operational flight object system is also configured to access aircraft current state data including, for example, information pertaining to a number of aircraft. Aircraft current state data can include an identifier for an aircraft and current state information about that particular aircraft, such as, without limitation, on-ground, climbing, cruising, descending, altitude, heading, weight, center of gravity, speed, and/or any other suitable state data.

The efficiency and operational flight object system is also configured to access or generate aircraft predictions that can include a number of flight plans and associated predictions for the trajectory and weather of an aircraft based on the number of trajectories associated with respective flight plans. Aircraft predictions can include aircraft state data predictions associated with a number of points in time based on forecast, derived and real time weather, flight plan, weight of aircraft, aircraft configuration, and/or any other suitable information. Aircraft predictions can include a number of trajectories that are calculated from flight path information provided from either an aircraft or a ground source using flight path restrictions, such as altitude, speed, and/or time, and planned flight events, such as gear extension.

The efficiency and operational flight object system can determine data environments based on the input source. Some or all of the functionality of the flight planning/processing device can be implemented on the device, and can also be implemented by computers at a third party service provider, AOC, and other providers in the flight planning framework. The various functions and capabilities of the efficiency and operational flight object system may be distributed and information can be communicated using various datalinks such the Internet, ACARS, and other communications links. By having such distributed functionality, and redundancy, loss of any one communications link can allow flight planning operations to continue using another link.

In one illustrative example, a pilot downloads a flight plan including route, weather, fuel, and other flight information to a flight planning/processing device executing some or all of the efficiency and operational flight object system. The flight planning/processing device communicates, if a network is available, to one or more servers or other data sources to obtain flight plan information. Prior to departure, the preliminary flight plan and operational flight plan can also become available for download. Using the flight planning/processing device, flight information in the preliminary and operational flight plans are optimized and prioritized for viewing on the flight planning/processing device.

In some cases, the pilot may discover a mismatch between the flight plan in the FMC and the flight plan downloaded on the flight planning/processing device. Alternatively, the pilot may have other reasons for desiring to update the flight plan information (e.g., deleting a waypoint), such as an unexpected change in the weather forecast or air traffic. The flight planning/processing device provides one or more methods for editing the flight plan information and allows inputs such as user notes for future reference or for reference by other users. Such inputs can be provided on the device using automation and manual entry methods. Manual entry methods can include a hard or soft keypad, freehand inputs, voice or video recording, photographs, or selection of a known and reused grouping of comments. Automation methods include, but are not limited to systems that decode and/or decrypt flight messages to ascertain information related to the particular flight. Using the flight planning/processing device, the user can view the user comments and a history of the comments for that particular flight or any flight.

The efficiency and operational flight object system is also configured to provide efficiency technologies for viewing and managing flight information. For example, the flight plan information may contain discontinuities that can be removed in an automated fashion by the efficiency and operational flight object system. The efficiency and operational flight object system, in some embodiments, also adds discontinuities in some instances, for example in scenarios involving ATC restrictions, minimize pilot training, or to place emphasis an area requiring additional pilot focus. The efficiency and operational flight object system is configured to identify more efficient routes than what is currently identified in the flight plan information. The efficient routes can be based on one or more criteria. The user may is also provided the ability to view what-if scenarios to determine impacts on changing conditions such as a change to the departure route. For example, the pilot can view other applicable runways based on possible relationships between routes and runways. The efficiency and operational flight object system is configured to identify available options, evaluates routes based on available constraints and criteria, consider course reversals automatically based on the core set and the intended route, and identify the most efficient route.

The efficiency and operational flight object system is also configured to perform performance analysis such as predictive and probable analysis of a flight route from user notes, user configuration, flight history information and real time flight information. For example, if the history indicates a high probability of a hold, the pilot can adjust adding extra fuel amounts accordingly. In yet another example, the efficiency and operational flight object system can calculate the probability that the hold will be a reality for that particular flight. The option for performance analysis can also be provided based on the context of the user's activities on the device.

By using such an efficiency and operational flight object system, users such as pilots can access, view, modify, and upload flight information in real time in an efficient and user friendly platform instead of being limited to manual viewing and editing on paper and entering information on installed devices such as the FMC, which have limited viewing and processing. Providing functionality of an efficiency and operational flight object system can provide greater flexibility, efficiency, and configurability to flight personnel. Further details are now described.

Referring to FIG. 1, illustrated is one embodiment of an efficiency and operational flight object system 100. The efficiency and operational flight object system 100 in this example includes ground server 105, web application 140, and mobile application 150. Ground server 105 further includes a flight object data warehouse 110, flight object services component 120, flight information services component 130, and a SOAP web service 137.

The ground server 105 can be located physically or virtually on the ground or on an airborne platform. The ground server 105 is configured to provide services by responding to requests to store, process, and deliver flight information and flight efficiency requests and advisories. The ground server 105 provides service as a database server, file server, web server, and application server.

The ground server 105 includes a flight object data warehouse 110 that is configured to maintain and store flight object data. The flight object data warehouse 110 integrates flight information from various air and ground systems into one central location. The flight object data warehouse 110 also integrates the original data from the source as well as derived flight information data. The flight object data warehouse 110 serves as a repository for real time and historical flight information. Additionally, the flight object data warehouse 110 serves as an embodiment of the aggregated flight plan and single source of the real-time flight plan.

The ground server 105 also includes flight information services component 130 that is configured to provide information for accessing various flight information. The flight information services component 130 includes a message constructor 132, surveillance service 133, NOTAMs component 135, weather service 131, pre/post departure component 134, and order fuel component 136. The message constructor 132 is configured to construct ACARS and Internet messages which are further detailed below. The weather service component 131 is configured to access or receive weather data from multiple sources, including in situ weather information, and process the weather data to, for example, provide a subscriber with weather data for a particular geospatial location and time.

The surveillance service component 133 is configured to process incoming aircraft surveillance data such as radar and flight messages with position data. The NOTAMs component 135 is configured to process notices to airmen from aviation authorities to alert pilots of potential hazards and other information along a flight route. The information can be extracted or parsed from a flight plan for display to a user. The order fuel component 136 is configured to interface and exchange information with other systems, processes request from other services, and generate orders for fuel. Pre/post departure component 134 is configured to perform various tasks pre-flight and post-flight, including processing flight plan, identifying aircraft status, catering requests, medical emergencies, closing the flight, and other user requests.

The ground server 105 also includes flight object services component 120 that is configured to provide functionality that will be described further herein, including optimization and efficiency processor, advisory service, flight plan processing, trajectory predictions, messaging service, navigation database information, performance analytics, probability and prediction services. In some embodiments, this functionality is accessible via an Application Programming Interface (API) by web application 140 and mobile application 150, which implement at least a portion of the functionality provided by ground server 105. The web application 140 and mobile application 150 are configured to provide a subset of or full functionality based on a system configuration, user configurations, and user privileges such as administrators, dispatchers, pilots, or AOC personnel.

Web application 140 can be loaded and executed on a computing device such as a desktop computer, and includes a map component 141, official flight plan (OFP) component 142, weather component 143, route/performance component 144, pre/post departure component 145/order fuel component 146, alternate airport component 147, secondary route component 148, and an optimization advisory component 149. The mobile application 150 can be loaded on a mobile computing device such as a tablet computer, and includes a map component 151, operational flight plan (OFP) component 152, weather component 153, route/performance component 154, pre/post departure component 155, order fuel component 156, alternate airport component 157, secondary route component 158, and an optimization advisory component 159.

The map component 141/151 is configured to generate mapping and charting displays based on selected flight information. The OFP component 142/152 is configured to receive and parse flight plan information and process and display the information. The route/performance component 144/154 is configured to process aircraft performance parameters pertaining to selected routes. The alternate airport component 147/157 is configured to receive a selection of an alternative airport and alternate route and generate a recommendation for an alternative airport and alternate route. The secondary route component 148/158 is configured to receive a selection of a secondary route and generate a recommendation for a secondary route. The secondary route component 148/158 is also configured to provide the ability for a user to send information to a selected secondary route. The ground server 105 also includes a Simple Object Access Protocol (SOAP) interface for exchanging information between the ground server and the Web application 140 and/or the mobile application 150. The optimization advisory component 149/159 is configured to receive advisory determined by the optimization and efficiency processor and advisory service 127. The optimization advisory component 149/159 generates the optimization and efficiency advisories displayed on a computing device.

The flight object services component 120 is the software and hardware framework used to calculate, deliver, and share flight plan, aircraft, weather, trajectory and navigation information, aircraft performance, predictions, and aircraft and internet messaging. The flight object services component 120 is configured to process flight information, user configuration files, airline business model algorithms, and regulatory constraints to calculate optimization and flight efficiency opportunities. The flight object services component 120 is also configured to process and determine several functions to be performed. One or more of these functions is used to determine an optimization or flight efficiency (time, fuel, cost, emissions) advisory which is provided to an authorized subscriber such as a pilot, air traffic controller or airline dispatcher. An example of another function that the flight object services 120 performs is performance analytics and probability and predictive analysis of singular and multi-dimensional current, historical and derived flight information.

The flight object services component 120 comprises multiple processors and an offline capability. The offline functionality uses a local cache for authentication, roles, and runtime settings data when a network or client connection is unavailable.

In the example depicted in FIG. 1, the flight object services component 120 includes a flight plan processor 126, navigation database processor 123, aircraft performance processor 124, weather grid processor 125, air/ground messaging service 122, and trajectory predictor processor 121. The flight object services component 120 is configured to invoke trajectory predictor processor 121 that determines flight trajectory predictions flight information such as the sequence of waypoints making up the flight plan/route, the aircraft type, current aircraft equipage, weather information and historical flight information in the flight object from the flight object data warehouse 110. The trajectory predictor processor 121 incorporates or communicates with weather service component 131 of the flight information services function 130. The weather service 131 determines in situ and forecasted weather information associated with a flight trajectory. The weather service 131 communicates the trajectory specific weather with the flight object data warehouse 110. The trajectory predictor processor 121 also identifies aircraft state data for the identified aircraft currently flying in accordance with the received flight plan/route. The trajectory predictor processor 121 updates the original flight trajectory using the aircraft state, navigation data, current and forecasted weather information and the in situ weather information to create an updated predicted flight trajectory with selected weather bands in the flight object. The navigation database processor 123 determines the navigational information valid for that particular date, and flight. The navigation database processor 123 communicates or makes the navigational data available for other services to access. One method for accomplishing this is by communicating the navigational data to the flight object data warehouse 110.

The trajectory predictor processor 121 can add and/or delete waypoints to the flight plan/route that is stored in the flight object, thereby creating a updated flight plan/route. In one example, the trajectory predictor processor 121 can send a message to the mobile application 150 indicating that an updated predicted flight trajectory and new flight plan/route is available. In response to the message, the flight object services component 120 accesses the list of waypoints in the flight object representing the updated flight plan/route and uses that processed list of waypoints to construct a payload for inclusion in a flight plan/route message for transmission. Alternatively, the flight object services component 120 can send the flight object to the mobile application 150 via API 128. The flight object services component 120 sets a flag or sends a message to the messaging service 122 indicating that a new flight plan/route and/or trajectory is ready for transmission (i.e., uplinking). In another example, the flight object services component 120 accesses the latest updated flight plan/route in the flight object and determines that an update was made by a subscriber and processes the updated information. An air/ground messaging service 122 is configured to make the appropriate interface connections, schedule, and perform the flight information message transmission.

Data such as a flight plan, aircraft performance information, pilot notes, takeoff information, and environmental information and the geospatial positions corresponding to the environmental information is provided to a message constructor 132 for inclusion in an flight information transmission. The flight information communicated to the message constructor 132 will also contain an aircraft identifier or user id, and security information to complete the construction of the flight information message.

The message constructor 132 is configured to construct a message header and construct a message comprising that header, the flight plan/route payload received from the flight object services 120, and a cyclic redundancy check. The message is constructed in a message format specified by the message user in accordance with a dynamically settable user configuration stored in a user preferences database. This user configuration specifies which functions or processes are running in parallel, and may also define connections to receive and transmit the data from the processors or databases shown in FIG. 1. The user configuration also specifies the behavior of the application. The message constructor 132 communicates the constructed message to an air/ground messaging service 122 that then uses a transmitter or applicable internet connections to transmit the message to the proper address(es). The message constructor 132 takes selected information and constructs an outgoing message for the end user(s) in a specified user message format. As part of the message construction process, the message constructor 132 encodes the flight information message received from various sources. The flight information message is reviewed and accepted by the flight crew and then autoloaded into the flight management computer. In the case of an updated flight plan/route message, the message constructor 132 takes the payload data representing the updated flight plan/route from the flight object services component 120 and constructs an outgoing message for the end user(s) in a specified user message format. In the case of an updated flight plan/route message uplinked to an aircraft, the updated flight plan/route is reviewed and accepted by the flight crew on a device executing mobile application 150.

The flight object services function 130 can be configured to perform the functions of translating and encoding flight information in a format suitable for inclusion in an updated flight plan/route message. An incoming message is decoded by a decoder function configured to parse the message by separating the various flight information parameters, for instance, flight plan/route, current position, speed, altitude, and in situ weather from one or more flight information messages. If the flight message was encrypted, then the decoder executes a process in which the flight message is decrypted. The decoder parses data out of the flight plan/route, and all flight information parameters, and maps that flight information data into applicable attribute fields of the flight object. The decoder converts user defined points such as latitude/longitude, floating waypoints, place bearing distance, or along track waypoints, intersections and airways and flight procedures into associated waypoints by internal computations or by reference to a navigation database which stores navigation information pertaining to waypoints, airports, airways, and procedures and customer information. Information retrieved from a navigation database can be stored in the flight object.

When an airway or procedure is identified in the flight plan/route of the flight information message, the decoder uses that airway or procedure information to perform a look up in a navigation database to query for additional data. For example, if the flight plan/route message identifies a standard instrument departure (SID) procedure which consists of a number of waypoints or fixes and a climb profile. The decoder uses the identified SID to query information in the navigation database. The navigation database query returns a listing of waypoints and other associated data. The returned waypoints are stored in the flight object.

The flight object services function 120 is configured to translate the waypoints stored in the flight object into a list of waypoints representing a flight plan/route. As part of this process, the flight object services function 120 determines which of these waypoints are applicable and in which order. The ordering of the waypoints is determined from the content of the message and adaptive logic guidelines. For example, transition types indicating one method of movement from one point to the next can be derived from the message content. One example of a logic guideline includes, for example, the required security, FMC operations and limitations, aircraft state, current or predicted flight information, the aircraft type and/or the airline operating the aircraft. Optionally, duplicate or extraneous waypoints, or waypoints that have been passed by the aircraft since the time when the flight plan/route message was received, are not included in the final list of waypoints. The listing of waypoints is stored in the flight object.

The flight object services 120 adds, reorders, or deletes waypoints to the flight plan/route that is stored in the flight object with the flight plan processor 126, thereby creating a new flight plan/route. The flight plan processor 126 combines the updated list of waypoints in the flight object to form a new flight plan/route by referring to a navigation database. The flight plan processor 126 translates sequences of waypoints into airways and flight procedures that are added to the flight object with flight object services 120. The flight object services 120 also takes into account the aircraft type, aircraft state data and the current location of the aircraft. For example, an identifier can identify multiple waypoints at different locations, and the flight object services function 120 determines which of those waypoints was intended based on the present location of the aircraft and the flight intent trajectory information.

The optimization and efficiency processor and advisory service 127 optimizes flight plan and trajectory, and fuel loading for cost, time, fuel, passenger comfort, airspace efficiency (capacity), and safety (i.e., weather, terrain). The optimization algorithms of the optimization and efficiency processor and advisory service 127 prioritizes the optimization preferences of one or multiple categories (i.e., cost, time fuel, passenger comfort, airspace efficiency, safety) for an integrated solution. The optimized solutions can be dynamically determined based on real-time assessment of the current, historical, probable and predicted flight information. Optimization advisories are provided for the departure, arrival, and approach lateral and vertical route, business constraints (i.e., crew cost, crew rest, flight schedule, connecting passenger), fuel loading, and time profiles.

The translated waypoint fields in the flight object are encoded by an air/ground messaging service 122 of the flight object services 120. The encoder parses the translated list of waypoints in the flight object and encodes the parsed data to construct a payload for inclusion in a flight plan/route message to be uplinked. The encoding places the parsed list of waypoints into the order required by a user-specified flight plan/route message format and encrypts the message. The message constructor 132 identifies the transition types (e.g., direct to or via) or manner in which the aircraft will maneuver. The transition type identifies how to maneuver between the various combinations of waypoints, airways, and procedures such as: waypoints to airways, airways to procedures, or waypoints to procedures. If requested by the user configuration or if the original downlinked message was decrypted, the constructed payload can be encrypted by an encoding function performed by the air/ground messaging service 122.

The efficiency and operational flight object system can include a number of specific efficiency enhancement functions as described below.

Mobile Automated Procedure Selection System

Aircraft operating above 18,000 ft. MSL and in instrument meteorological conditions (IMC) typically operate under an instrument flight plan. The instrument flight plan is based around specific instrument enroute routing, departure, transitions, and arrival procedures. Each airport has many different approach and departure procedures and numerous variations of each, which introduces a multiplicity of viable approach and departure procedures when constructing the instrument flight plan. There are thousands of instruments procedures in the United States in operation at airports with many options being available for the same runway. For example, a runway may have NDB, VOR, ILS, ILS DME, ILS CAT I, CAT II, or CAT III options available. With so many options available, choosing the most efficient procedure can be a challenge when factors such as aircraft equipage, ground path track miles, time, speed, current, and predicted weather, fuel burn, airspace delays, current and predicted aerodrome environments, and aircraft schedule are taken into consideration.

During typical operations, a pilot selects the departure airport, and the pilot is presented with a list of the applicable runways and instrument arrival, departure, and approach procedures for that departure airport. The pilot then selects a runway and receives a new listing of departure procedures applicable to the chosen runway. This process continues for each selection made by the pilot. For each selection made, the previous options are typically removed. The removal of the previous options can be particularly disadvantageous when an air traffic controller changes one or multiple procedures in the flight plan based on the conditions of the aerodrome.

In at least one embodiment, the efficiency and operational flight object system includes functionality that allows an approved user (e.g., pilot, dispatcher, air traffic controller) to view and select one or more routes where the route are composed of procedures applicable to a flight (e.g., route, SID, transitions, runways, and STAR). The selection of efficient routes is accomplished manually or through automation. The most efficient route (e.g., approach, arrival and departure route) is automatically determined based on currently available flight information including the total current aerodrome environment. The automation algorithms used to determine the most efficient route considers course to the destination, time, fuel, airline costs, distance, weather, air traffic controller, weather, environment, terrain, and regulatory restrictions, direct routing and back courses. The algorithms also consider a time aspect of the flight information to determine its relevance or value in determining the most efficiency route. The most efficiency route varies depending on the currency of real-time, historical, probabilities and forecasted flight information. The determination of the efficient route also takes into account the timeframe of the flight to determine the most advantageous time-based route ("4D" route).

Referring to FIG. 1, a user can use a mobile device executing mobile application 150 to view and select one or more procedures of a route applicable to a flight. The mobile application 150 is configured to generate a user interface such as the user interface (UI) 200 illustrated in FIG. 2. UI 200 can be rendered in a window of a Web browser or other client application executing on the efficiency and operational flight object system device. The illustrated fields are provided to illustrate examples of possible user interface options that are provided to a user. As further described herein, additional fields may be provided, and some of the fields may be optional.

Figure 2:
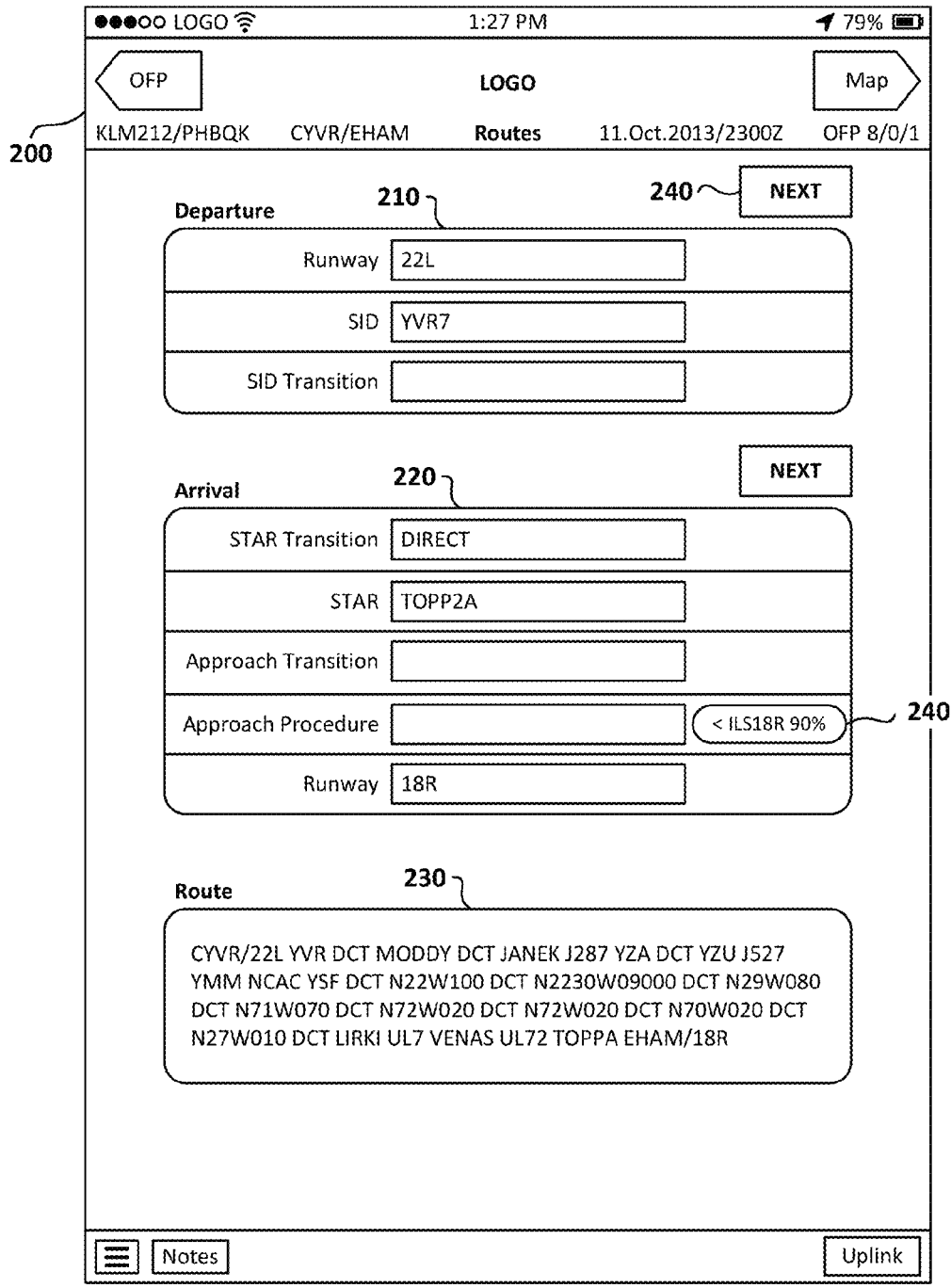
FIG. 2 depicts an example user interface that is rendered on a computing device executing the mobile application of FIG. 1 to allow any approved user to view and select procedures applicable to a flight or to accepted automated advisories for the most efficient arrival and departure route.

FIG. 2 illustrates departure information 210 and arrival information 220. The user selects current flight plan entries and selects user control 240. In response, the mobile application 150 sends the selected information to flight object services component 120 in ground server 105 via API 128. The flight object services component 120 searches through all procedures (e.g., RWY, SID, SID transitions, STAR, STAR transition, Approach, Approach Transition, RWY) to determine if any are applicable for the origin and destination airports (e.g., SEA/AMS). If none of the procedures are applicable for the origin and destination, the flight object services component 120 is configured to identify a number of suggestions such as DIRECT TO and send the suggestions to mobile application 150. The user can view and accept an advisory or request another advisory based on a higher priority category for consideration (i.e., time versus fuel). For example, a user can communicate with ATC to determine if an advisory is possible. If an advisory is not possible, then the user can modify an input category on user window 200 and mobile application 150 the modified input to flight object services 120 to generate and return another advisory.

Figure 3:
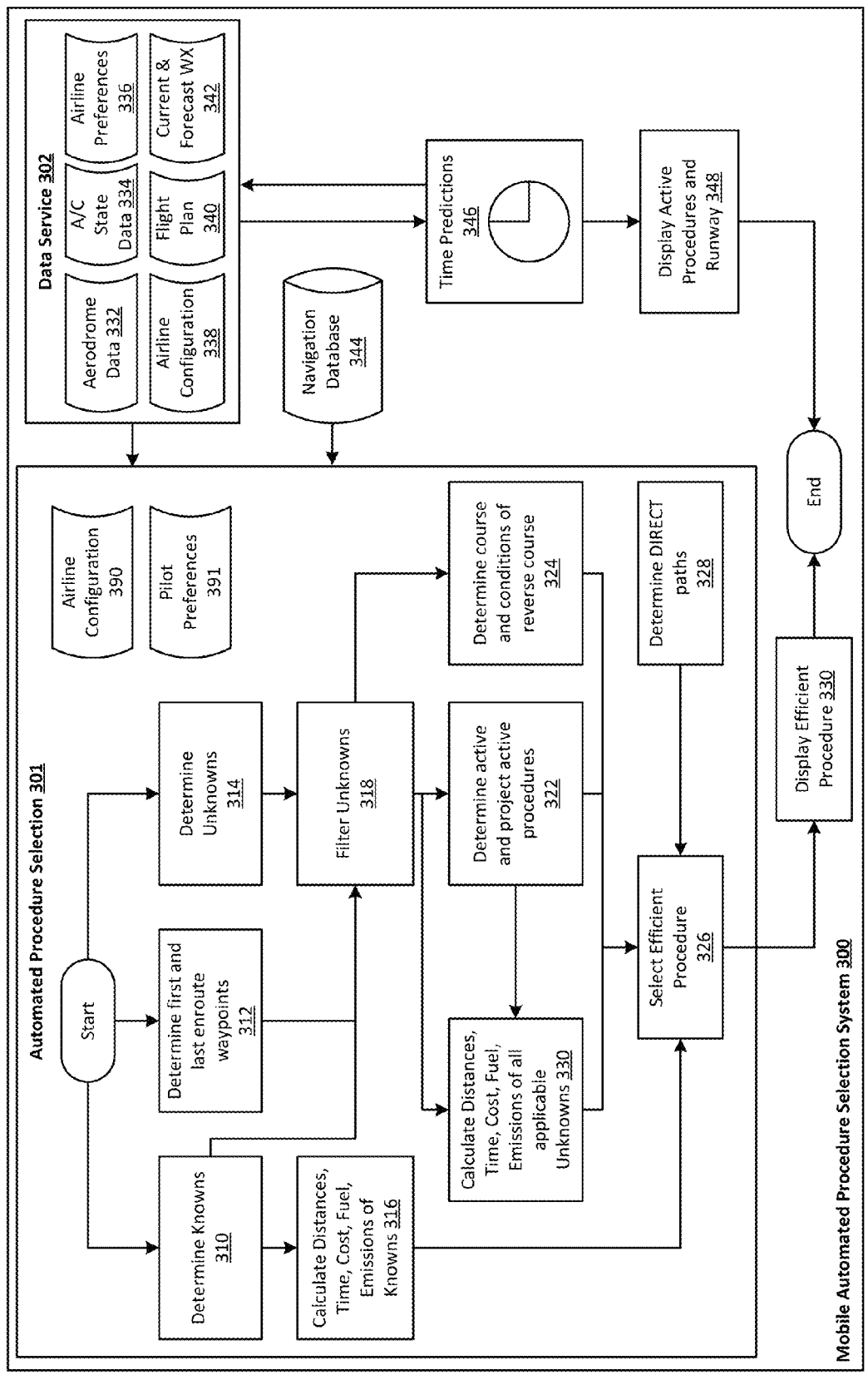
FIG. 3 depicts an example automated procedure selection system that is implemented on a computing device executing the mobile application of an efficiency and operational flight object system.

Mobile application 150 is configured to automatically identify the most efficient route based on available flight information. By automatically providing efficient route advisories, a pilot need not analyze multiple route options (i.e., arrival, departure, routes, etc.) with little or no suggestion as to which options may be more advantageous. In one example depicted in FIG. 3, illustrated is a mobile automated procedure selection system 300 in accordance with the present disclosure. The automated procedure selection system 300 can be implemented by optimization and efficiency process and advisory service 127 in flight object services 120 of FIG. 1. The mobile automated procedure selection system 300 includes an automated procedure selection function 301 and data service 302.

Mobile automated procedure selection system 301 begins with determining known information 310 that can include airline configuration 338 and procedures from navigation database 344 that have been already entered to expedite and reduce data entry error when selecting procedures. Mobile automated procedure selection system 301 can determine the first and last enroute waypoints 312 and determine unknown information 314. The determined known information are used to calculate parameters 316 for the known information such as distances, time, cost, fuel, and emissions. The first and last enroute waypoints and the unknowns are used to filter the unknowns 318. The mobile automated procedure selection 301 calculates parameters for flight information 330 such as distances, time, cost, fuel, and emissions. Active and projected active procedures are determined in operation 322, and the course and conditions of the reverse course are determined in operation 324. Airline configuration data 390 and pilot preferences information 391 are used when making the determinations of an automated procedure selection 301.

An efficient procedure is selected in operation 326, and direct paths are determined in operation 328. The selected efficient procedure is displayed on the device in operation 330. Various flight information are accessed as needed and as the flight information becomes available and updated. For example, data service 302 includes aerodrome data 332, aircraft state data 334, airline preferences data 336, airline configuration data 338, flight plan data 340, and current and forecasted weather data 342. The data service 302 is used to determine time predictions 346, and active procedures and runways are displayed on the user device in operation 348. Automated procedure selection function 301 also has access to a navigation database 344.

Figure 4:
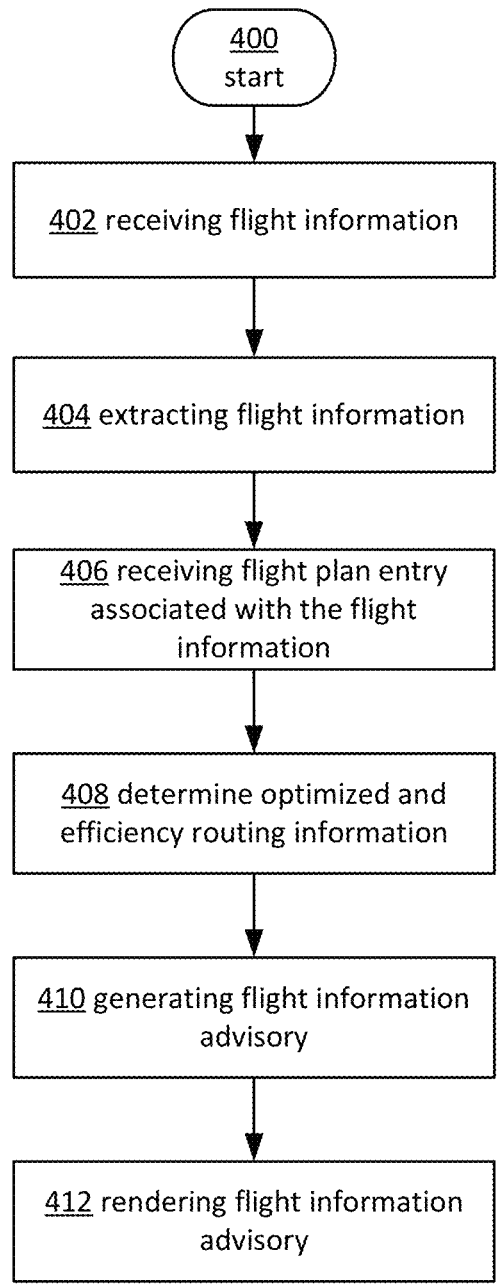
FIG. 4 is a flowchart depicting an example procedure for generating flight data in real time using the efficiency and operational flight object system.

FIG. 4 illustrates an example operational procedure for generating flight information in real time that can be executed on one or more components of grounder server 105, web application 140, or mobile application 150 of FIG. 1. In an embodiment, the procedure can be implemented in one or more components illustrated in FIG. 1. Referring to FIG. 4, operation 400 begins the operational procedure. Operation 400 is followed by operation 402. Operation 402 is the step of receiving flight information indicative of one or more flight objects. Operation 404 is the step of extracting flight information. Operation 406 is the step of receiving a flight plan entry associated with the flight information. Operation 408 is the step of determining optimized and efficiency flight plan routing, fuel loading, departure, arrival, and approach procedure flight information. Operation 410 is the step of generating an optimized and efficiency flight plan routing, fuel loading, departure, arrival, and approach procedure flight information advisory. Operation 412 is the step of rendering the optimized and efficiency flight plan routing, fuel loading, departure, arrival, and approach procedure flight information advisory for viewing.

Mobile Flight Object Regulated Communications

A briefing package for a flight is typically generated by an airline operations center. An airline dispatcher may generate the flight briefing package, which may comprise such items as Notices to Airmen (NOTAMs), weather, flight path, aircraft weights, weather along the route, and general weather information. The dispatcher may also file the flight plan with the appropriate air navigation service provider (ANSP) authorities as well as provide the flight plan to the pilot. Either the ANSP or the pilot can request modifications, and the dispatcher may respond to the request.

The lateral portion of the flight plan is typically the primary focus that is negotiated between an ANSP and the dispatcher, while the dispatcher and pilot often negotiate the lateral path, and the aircraft weight, including fuel. Once finalized, the dispatcher may output the briefing package for the pilot to commence the flight. The pilot typically prints out the final briefing package and walks out to the aircraft. A growing trend is to also output the briefing package in an electronic form such as PDF. The PDF may then be viewed on the pilot's mobile device.

With the pilot at the aircraft and the departure time approaching, the dynamics of the real world can have a significant impact, requiring last minute changes to the flight plan or briefing package. For example, the flight plan and briefing package may change based on changes in the total airspace environment, which may have an impact on the quantity of fuel loaded on the aircraft. Such dynamic real world changes need to be continuously communicated between all parties, reauthorized as appropriate, and finally loaded into the automated flight systems (e.g., FMC) to be flown. Currently there are no systems that perform synchronization across multiple air traffic, airline systems, and the aircraft due to the multiple formats and lack of operational knowledge of each system that the flight plan can take. This inherently causes issues when the user is trying to make dynamic changes to reflect real-time events. Generally, the user can make changes in their own environment, but the changes will not be replicated across the entire system including the aircraft. Furthermore, when the user makes the changes in their local system, the rationale for the change is not captured and distributed across the entire system.

The efficiency and operational flight object system includes functionality that allows an authorized user to dynamically make changes to a flight plan and communicate the changes across multiple or local systems and subscribers. The changes are synchronized across the multiple or local systems (i.e., the latest or relevant changes are communicated to the appropriate systems and subscribers as they become available so that all parties have the latest changes). In order to accomplish this synchronization, changes must be tracked for each system and messages are automatically generated for each of the systems' and subscriber's communication protocols. The systems and subscribers include the on-board flight management system, mobile devices, local agencies, and ATC. The changes, their status, and associated information (e.g., rationale for the changes) can be viewed in real-time. By providing a way to update flight plans from heterogeneous systems, dynamic updates to flight plans from various sources can be accommodated in an efficient manner.

Figure 5:
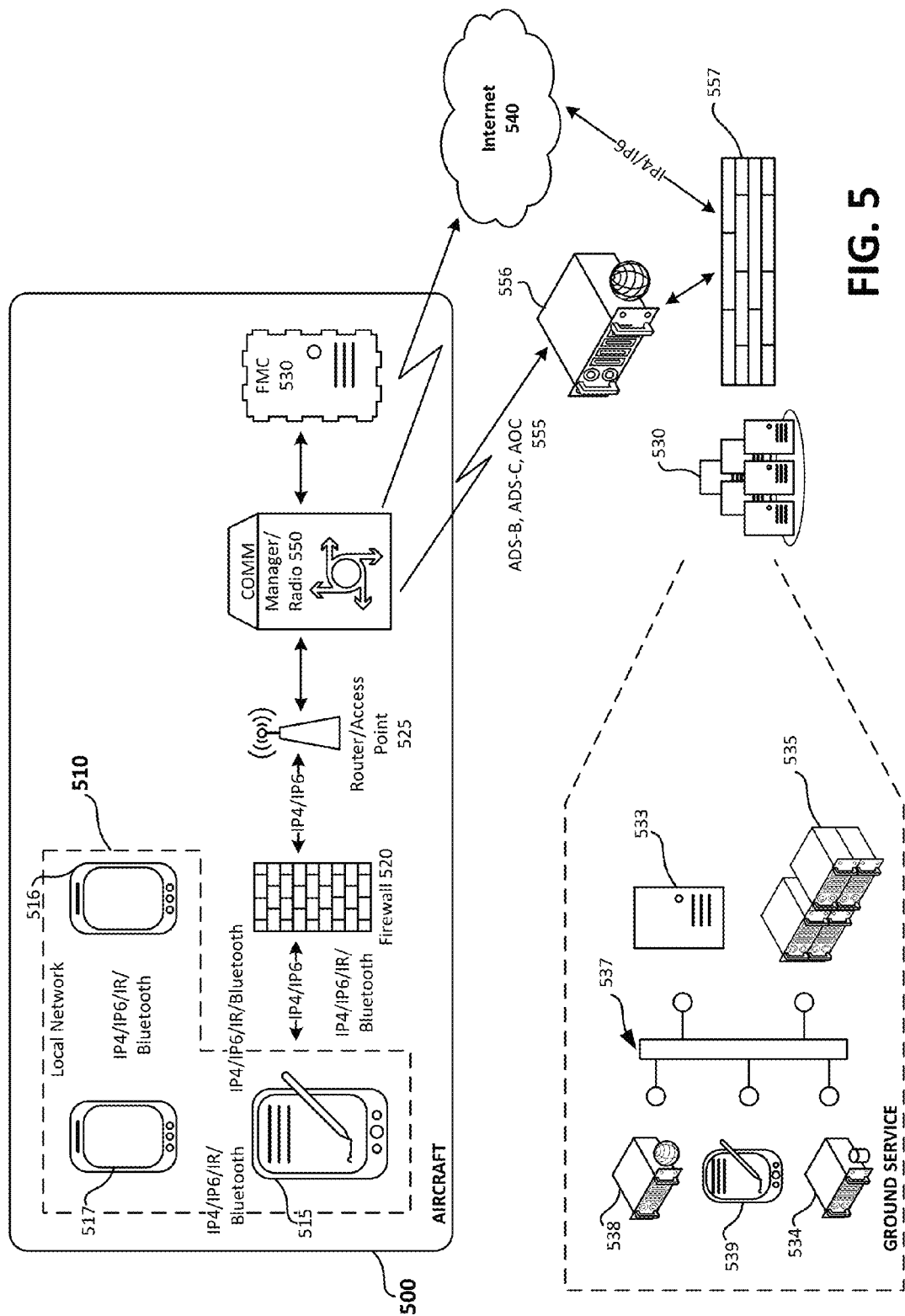
FIG. 5 depicts an example of flight object regulated communications system for sharing flight information between multiple users of an efficiency and operational flight object system including on-board and ground-based systems.

In one example depicted in FIG. 5, illustrated are an aircraft system 500 and a ground service system 530 showing an example of dynamically tracking and making changes to a flight plan and synchronizing and communicating the changes across multiple or local systems for multiple subscribers. Systems on aircraft 500 include a local network 510 where devices such as flight planning/processing devices 516, 517 and efficiency and operational flight object system device 515 are communicatively coupled using standard protocols such as BLUETOOTH and 802.11. In at least one embodiment, the local network 510 is configured to access to other onboard systems via a firewall 520 and/or via a router or access point 525. With proper credentials and authentication, the flight planning/processing device 516, 517 is provided access to the FMC 530, COMM radio/manager 550 and other on-board systems. COMM radio/manager 550 is communicatively coupled to ground services 530 using a plurality of communications links such as the Internet 540 and ADS-B, ADS-C and AOC 555 communicating via transceiver 556 with internet access and ground service firewall 557.

The flight planning/processing devices 516, 517 are also configured to execute the mobile application 150 from FIG. 1. The user can use the flight planning/processing devices 516, and 517 configured in this manner to view a flight plan. The user determines changes to the flight plan based on the latest information regarding the airspace environment and its impact on the current flight plan (e.g., the quantity of fuel loaded on the aircraft) and enter changes to the flight plan. Once entered, the changes to the flight plan are synchronized by sending flight information messages comprised of all or only specific changes for each subscriber via an available connection to firewall 520. The flight information (i.e., changes) communicated may not be all the flight plan changes but may only be the specific changes each subscriber requested since the last synchronization or based on their preferences. The changed flight information is send to the router/access point 525 to COMM manager/radio 550 for transmission to ground service 530 via the internet 540. Ground service 530 can include servers 534, 535, and 538, computer 533, and mobile device 539, that are communicatively coupled via network 537. Ground service 530 can implement one or more functions depicted for ground server 105 in FIG. 1. Ground service 530 is configured to generate the correct messages for various subscribers based on their respective communication protocols, using message constructor 132 of flight information services component 130. Message constructor 132 of flight information services component 130 construct flight plan/route messages in the appropriate message formats specified for the target systems. The message constructor 132 constructs an outgoing message for the target systems. The new or updated flight plans are thus transmitted to the various subscribers, on-board flight management system, or mobile devices using air/ground messaging service 122.

The efficiency and operational flight object system device 515 is also configured to receive and store annotations and other information such as the rationale for flight information changes. The user notes can be dynamically generated based on the current situation or from predefined categories for common classifications of notes. The efficiency and operational flight object system device 515 is configured to transmit the updated flight plan and related annotations to the on-board flight management system or other devices on the on-board network. The on-board network is communicatively coupled to networks such as the Internet. The updated flight information can thus be communicated to ground service 530 via the Internet. The efficiency and operational flight object system device 515 is configured to communicate to the Internet via on-board router/access point 525.

Ground services 530 include ground based servers 535 that execute the some or all of the efficiency and operational flight object system. The ground services 530 are communicatively coupled to additional ground networks 537 that may also include the Internet. Various systems and subscribers 533, 534, 538, 539 are communicatively coupled to ground networks 537, including mobile computing devices, local agencies, and ATC. The ground based servers executing the efficiency and operational flight object system are configured to automatically generate, translate, and format the updated flight information received from the efficiency and operational flight object system device 515 for each of the systems' and subscriber's communication protocols. In this way, the various systems and subscribers are updated and synchronized with the updated flight information, status, and associated information (e.g., rationale for the changes), which can be viewed in real-time as flight information becomes available.

In one operational example, an authorized user such as a pilot can use the efficiency and operational flight object system device 515 to view current flight plan information. Efficiency and operational flight object system device 515 executes the efficiency and operational flight object system to view a previously downloaded flight plan. The user can choose to view flight plan information using available user interfaces on the efficiency and operational flight object system device 515, such as a departure/arrival/route format screen, lateral, vertical, or speed profile screens, and/or a map view. The user interacts with the user interface to make changes to flight information. The user can use inputs means such as a touch screen on the efficiency and operational flight object system device 515.

The efficiency and operational flight object system device 515 receives and stores the changes. Efficiency and operational flight object system device 515 communicates the changes via an onboard communications channel, using an onboard wireless terminal or other communications means. The changes are then transmitted to ground services 530 via the Internet. The updated flight plan information is received and processed by ground services 530 and forwarded to various local systems and subscribers via messages that are generated for each of the individual systems' and subscribers' communication protocols.

The efficiency and operational flight object system device 515 can also execute on a ground based server that updates flight information. For example, a flight information services provider can update flight information based on the latest weather information and send the updated flight information via the Internet to local systems and subscribers via messages that are generated for the systems' and subscribers' communication protocols. The updates are also sent to the on-board system via the Internet and ground-to-air communications channels. Once on-board, the updated flight information is sent to the efficiency and operational flight object system device 515 and the flight management computer 530 via on-board networks.

Figure 6:
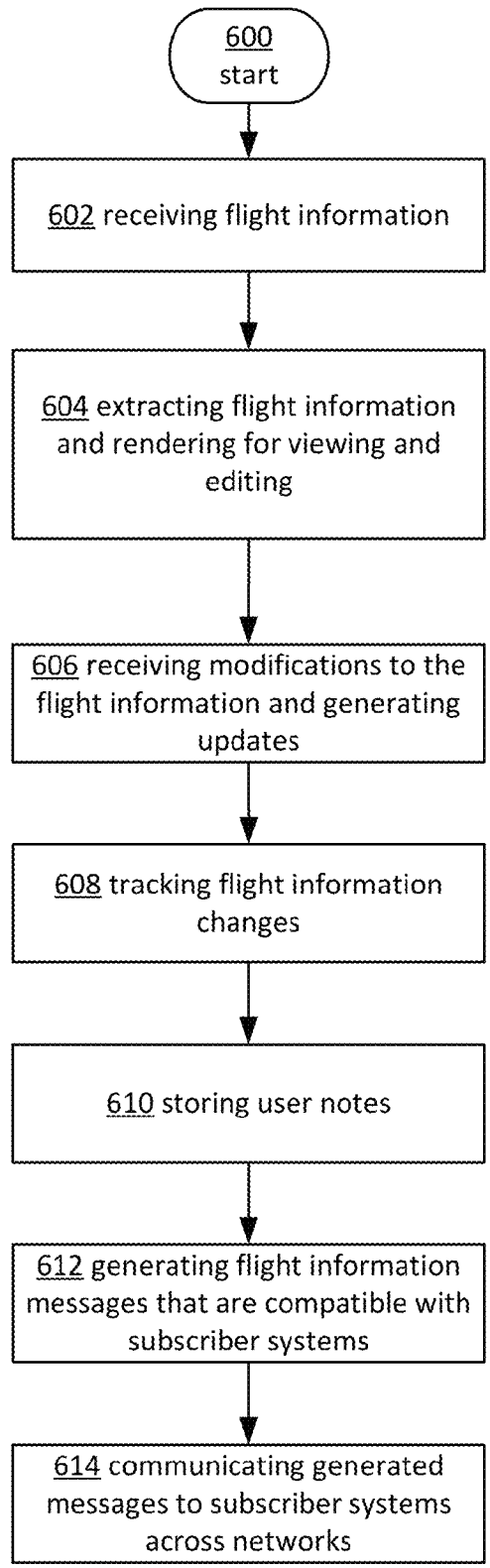
FIG. 6 is a flowchart depicting an example procedure for communicating and sharing flight data between the flight object regulated communication systems.

FIG. 6 illustrates an example operational procedure for dynamically changing, communicating and synchronizing flight information between a plurality of systems that can be executed on one or more components of ground server 105, web application 140, or mobile application 150 of FIG. 1. Operation 600 begins the operational procedure. Operation 602 is the step of receiving, on a computing device, flight information indicative of one or more flight objects. Operation 604 is the step of extracting flight information from the one or more flight objects. Operation 606 is the step of receiving modifications to the flight information and generating updates to the one or more flight objects. Operation 608 is the step of tracking flight information changes applicable to one or more subscriber systems. Operation 610 is the step of storing user notes associated with the flight information changes. Operation 612 is the step of generating flight information messages representative of the updated flight information that are compatible with one or more subscriber systems. Operation 610 is the step of communicating the generated flight information messages to the one or more subscriber systems across the one or more networks.

Flight Analogous and Projection System

As a flight commences, actual flight data may be recorded in periodic increments as well as during specific flight events. Examples of actual flight information can include the flight plan issued by airline dispatch, the flight plan in a flight management computer, a flight plan in an ATC system, accelerations, decelerations, aircraft position, altitude, speed, fuel on board, weight, heading, course, flap position, course, voice communications, etc. Recording of the flight plan and the actual flight information, both separate pieces of flight history, can be correlated to give a recount of the performance of actual flight information to a flight plan. This comparison is valuable to identify efficiency and optimization opportunities.

In at least one embodiment, the efficiency and operational flight object system includes functionality that allows an approved user (e.g., pilot, dispatcher, air traffic controller) to view a graphical depiction of an active flight plan in conjunction with multiple flight plans and flight histories. In yet another example, specific flight history data, past flight plans, or flight history most related to the active flight plan is highlighted or annunciated. Various options are configurable by the user. For example, options can be configured by similar route, speeds, altitude, aircraft type, date range, origin, destination, departure time, arrival time, tail number, pilot's name, or flight number of one or more airline operators. In one embodiment, all data stored in the flight object data warehouse are searched, and the flights or flight information most analogous to the active flight plan are identified.

The efficiency and operational flight object system includes functionality for generating projections to a flight plan. For example, referring to FIG. 1, a user can select flight history data that is analogous (e.g., same flight during a prior time, or another flight with a similar route) using a UI generated by mobile application 150 executing on a user computing device. Using the UI, the user selects a range of information based on a date range and other parameters. The user can then select an option to apply the information to the active, secondary, and/or alternate flight plan. The information selected by the user is sent to the flight object services component 120 of ground server 105. The trajectory predictor processor 121 will also generate a projected outcome (a projection of the selected data onto the active, secondary, or alternate flight plan). The trajectory predictor processor 121 generates flight information predictions and projections. The projected outcome based on the flight plan/route, the flight information entered by the user, and current, historical and/or forecast flight information conditions is sent to the user computing device and rendered on the UI by mobile application 150.

Additionally, the user can select portions of the analogous flight history data or manually tailor the flight information history to generate hypothetical projections. The user then modifies the active, secondary, or alternate flight plan based on the tailored flight information or the hypothetical projections. Having completed the projection processes, the efficiency and operational flight object system 100 in FIG. 1 is also configured to generate advisories in the optimization and efficiency processor and advisory service 127 indicating discrepancy areas (e.g., flight phases such as climb, cruise, descent) and where specific parameters exceed configurable acceptance tolerance when analyzing historical, actual, and planned flight information of the current aircraft or reference flights.

Figure 7A:
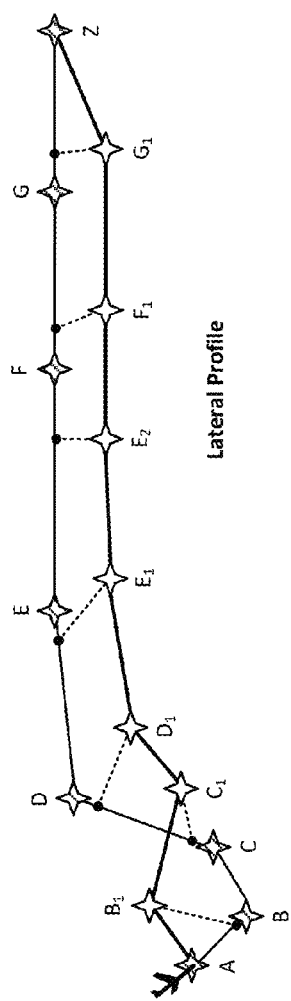
FIGS. 7A, 7B, and 7C depict examples of flight profiles that are generated in real time to provide aircraft performance and event probability/forecast predictions.
Figure 7B:
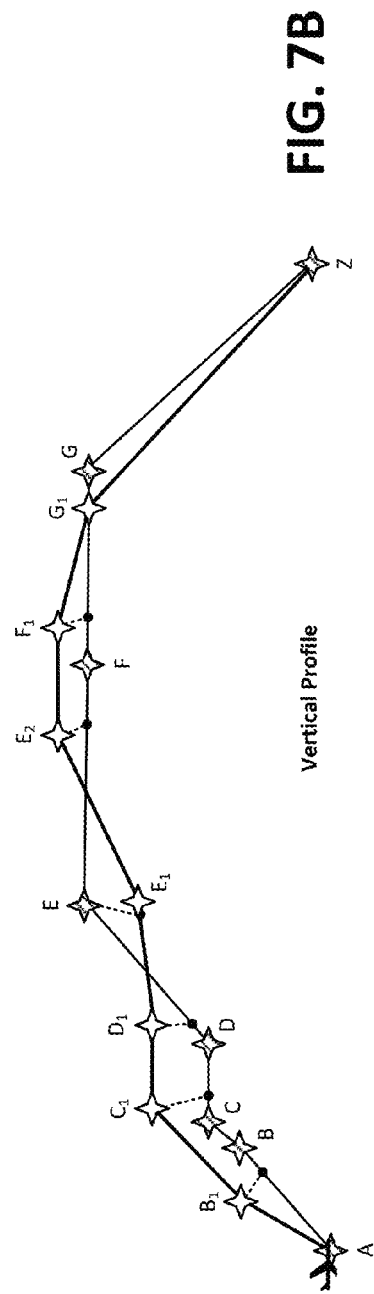
Figure 7C:
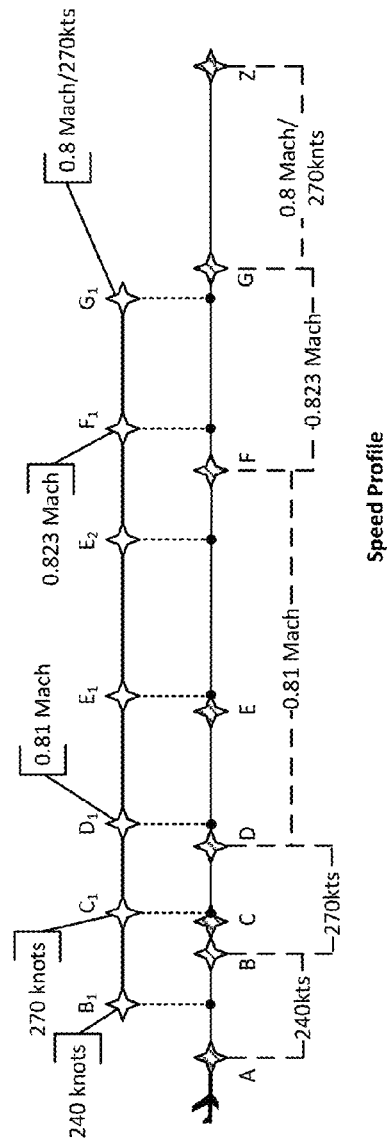

FIGS. 7A, 7B, and 7C are graphical depictions of an active flight plan in accordance with the present disclosure. FIG. 7A illustrates a depiction of a lateral profile of a flight plan. FIG. 7B illustrates a depiction of a vertical profile of a flight plan. FIG. 7C illustrates a depiction of a speed profile associated with the lateral portion of the flight plan. The figures illustrate examples of graphical depictions of an active flight plan and actual flight information in conjunction with multiple flight plans, flight histories, and real time flight information. The profiles are generated by mobile application 150 or web application 140 executing on user computing devices. The user can also access a UI such as the one shown in FIG. 8. A module executing in the efficiency and operational flight object system presents a user interface (UI) 800 to the user in a window of a Web browser or other client application executing on an efficiency and operational flight object system device. The UI 800 graphically depicts a flight route and other selected flight information. As further described herein, additional flight information may be depicted, and some elements of the UI 800 may be optional. The UI 800 highlights or annunciates specific flight information history such as past flight plans specific to that aircraft or flight, or flight information from any flight may be applied for comparison. Any flight, and its flight information, may be used for comparison as long as at least one flight information parameter can be correlated to the current flight selection. The correlation parameters can be manually selected or automated. Automation is the preferred method to detect the flights and flight information that is of closet match. For example, the options can be configured by similar flight route, portion of a flight route, speeds, altitude, aircraft type, date range, origin, destination, departure time, arrival time, tail number, pilot's name, or flight number. If left unrestricted, the mobile application 150 provides no parameters to the flight object services 120. The flight object services 120 is free to search all data stored in the flight object data warehouse 110 and annunciate the flights or flight data most analogous to the active flight plan.

An embodiment of the analogous flight information is projected to the active flight plan. The user can apply the analogous flight history data to the active flight plan, thus allowing the user to observe a projected outcome. Furthermore, the user is allowed to manipulate or tailor the flight information history to observe hypothetical projections. The use of analogous flight information to provide "what if" flight plan scenario manipulations is useful because analogous flight information history is typically not available in an organized way that can be used for rough-drafting a flight plan.

Figure 9:
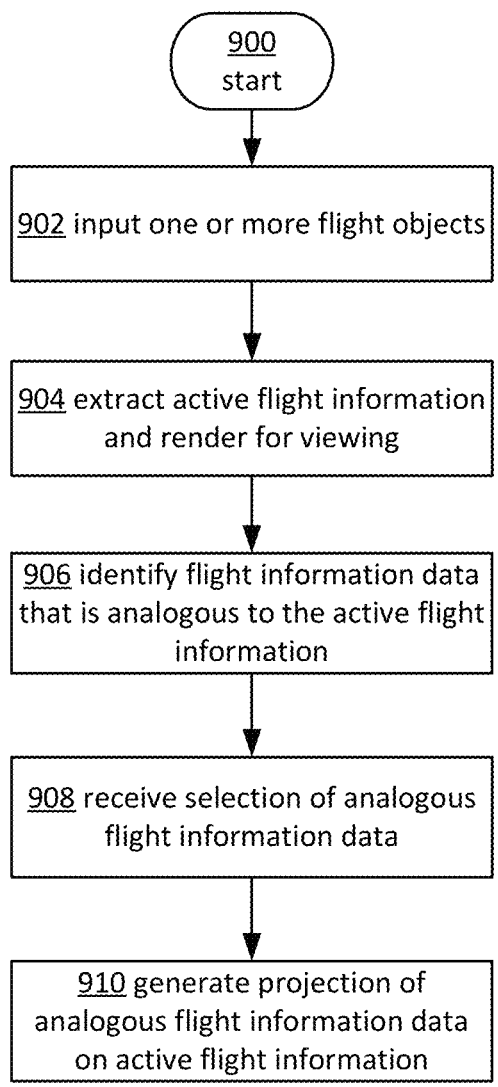
FIG. 9 is a flowchart depicting an example procedure for generating projected flight information using the flight data of FIG. 8.

FIG. 9 illustrates an example operational procedure for generating projected flight information that can be executed on one or more components of grounder server 105, web application 140, or mobile application 150 of FIG. 1. Referring to FIG. 9, operation 900 begins the operational procedure. Operation 902 is the step of inputting one or more flight objects to a computing device configured with an efficiency and operational flight object system. Operation 904 is the step of extracting active flight information from the one or more flight objects and rendering the active flight information for viewing. Operation 906 is the step of identifying flight information history that is analogous to the active flight information. Operation 908 is the step of receiving, via at least one input mechanism of the mobile computing device, a selection of at least a portion of the analogous flight information history. Operation 910 is the step of generating a projection of the analogous flight history data on the active flight information.

Aircraft Performance Predictions

For commercial airplane flights, there are significant amounts of flight information in various formats from various sources available in preflight, during flight, and post flight. This data may include planned data, real time data reported directly from the aircraft, surveillance data, weather data, data collected from the aircraft post flight, data collected from the pilots, or data collected from other data sources. This data may be used in real time or collected and archived as flight history data.

In one embodiment of an efficiency and operational flight object system includes functionality that generates aircraft performance predictions based on real-time flight information, manually entered flight information, other flights' flight information, historical flight information, probabilities, current predictions, and pilots' notes. Typically, the flight information is related to that particular flight and does not include other flight or aircraft information. For example, Flight UU123, a Boeing 737 aircraft, would consider flight route information from UU227, a Boeing 777 aircraft. Flight UU123 and UU227 are operating at the same altitude, arrive at the same destination minutes apart but have different origins. Based on this flight information, new optimization opportunities are identified and updated flight predictions are generated. Examples of flight predictions include new or updated departure times, fuel consumption, predicted weather, airspace delays, predicted speeds, cost index, predicted altitudes and other performance related predictions. The predictions are accompanied by a probability distribution that indicates the expected likelihood of the prediction. Additionally, flight information history (including pilot notes) is used to generate new or updated flight plan and aircraft performance predictions and their probabilities.

The user can select a date range, an airline, flight number, tail number, or other filtering criteria. Manual entries can be entered directly on a mobile device. The various inputs can be manipulated by the user to create hypotheticals so that the user can view the impact on the predictions.

Flight information history is used to provide aircraft performance predictions such as fuel loads, fuel burn rates, cost index, flight times, flight path updates, step climbs and other performance related predictions. Aircraft performance predictions based on flight information history are processed for a selected date range and can be based on an airline, flight number, tail number, or other filtering criteria. For example, with reference to FIG. 2, given the inputs provided in windows 210 and 220, the efficiency and operational flight object system generates a prediction (ILS18R in this example). Additionally, the prediction includes a probability associated with the prediction (90% in this example). The probability takes into consideration various possible events that, for example, may change the arrival runway from the current prediction of 18R such as emergency events, controller preferences, noise abatement procedures, weather events, or airport traffic.

By predicting performance (e.g., hold time, arrival time, fuel burn, passengers making connections, etc.) and their probabilities of occurrence based on real time conditions and flight history for a given route or time, pilots need not access and analyze vast amounts of flight information for the benefit of improving operational performance.

With reference to FIG. 1, flight object services 120 executing on ground server 105 is configured to generate aircraft performance predictions based on flight information received via API 128 from a user device executing mobile application 150 or web application 140. The flight information can include, for example, real-time flight information, manually entered flight information, other flights' flight information, historical flight information, probabilities, current predictions, and pilots' notes. The user can also select a date range, an airline, flight number, tail number, or other filtering criteria. Manual entries can be entered directly on the mobile device using the rendered UI. Based on this information, flight object services 120 executes functions such as flight plan processor 126, navigation database processor 123, aircraft performance processor 124, and trajectory predictor processor 121 to generate flight predictions. Examples of flight predictions include new or updated departure times, fuel consumption, predicted weather, airspace delays, predicted speeds, cost index, predicted altitudes and other performance related predictions. The flight predictions are sent to mobile application 150 executing on a user device, where the flight predictions are rendered on a user display by mobile application 150. The predictions are accompanied by a probability distribution that indicates the expected likelihood of the prediction. The probability distribution can be indicated by a percentage probability (e.g., 1 to 99%) or a term of high, medium, or low, and can be accompanied by other statistical indicators (e.g., colors). Additionally, flight information history (including pilot notes) is used to generate new or updated flight plan and aircraft performance predictions such as fuel loads, fuel burn rates, cost index, flight times, flight path updates, step climbs and other performance related predictions and their probabilities. The various inputs can be manipulated by the user to create hypotheticals so that the user can view their impact on the predictions.

Figure 10:
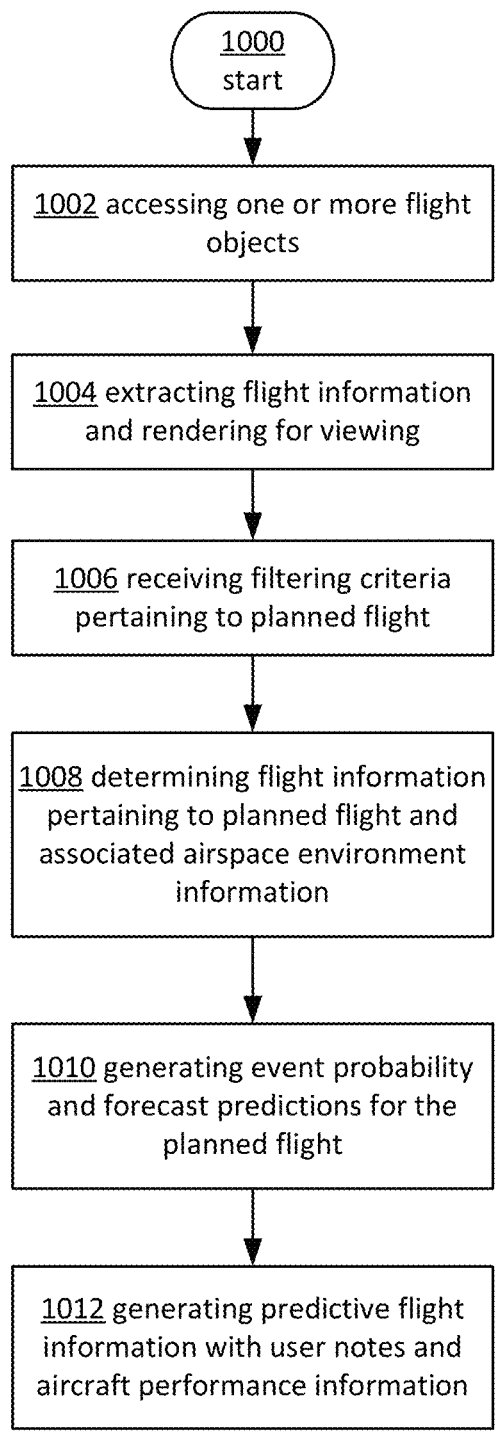
FIG. 10 is a flowchart depicting an example procedure for generating probable and predicted flight plan information as implemented on a computing device executing the mobile application.

FIG. 10 illustrates an example operational procedure for generating predicted and probable flight information that can be executed on one or more components of ground server 105, web application 140, or mobile application 150 of FIG. 1. Management of flight objects include tasks such as handling and viewing flight objects, resolving conflicting information, determining validity, confirming changes to flight objects, modifying flight objects, and transmitting flight objects prior to transmission. Referring to FIG. 10, operation 1000 begins the operational procedure. Operation 1002 is the step of accessing one or more flight objects on a computing device configured with an efficiency and operational flight object system. The one or more flight objects can be accessed via at least one network communicatively coupled to the computing device, the one or more flight objects associated with flight information. Operation 1004 is the step of extracting flight information from the one or more flight objects and rendering the active flight information for viewing. Operation 1006 is the step of receiving, via at least one input mechanism of the computing device, one or more filtering criteria pertaining to a planned flight. Operation 1008 is the step of determining flight information pertaining to the planned flight and associated airspace environment information based on the filtering criteria. Operation 1010 is the step of generating event probability and forecast predictions for the planned flight based on the determined flight information. Operation 1012 is the step of generating predictive flight information with user notes and aircraft performance information using the generated event probability and forecast predictions.

Automatic Real-Time Flight Plan Updates

During a flight, pilots typically capture various predicted and current flight information and personal observations for situational awareness, enroute planning, and for logging differences between actual flight information and planned flight plan. Pilots also need to exchange notes or other flight plan information in an efficient manner from the flight planning/processing device to another device onboard an aircraft. The pilot notes, or user notes, can entail observations associated with cargo, fuel, runway conditions, braking actions, weather observations, wildlife and other information that a pilot may record. The flight information includes user notes, flight plan changes, actual time sequencing of a waypoint, weather, turbulence, fuel on board, fuel at destination, estimated time of arrival at the destination, and many other important data points. The pilot typically manually logs each of these data points and personal observations during the flight and updates the original filed flight plan.

In at least one embodiment, the efficiency and operational flight object system includes functionality that captures and compiles current and predicted flight information in real-time and automatically makes that data available to the user's device to update the original filed flight plan. The user's device can be a mobile computing device executing the efficiency and operational flight object system. The updated flight plan data is sent to the FMC via a ground or airborne service using one of a plurality of communications channels that is manually selected by the user or automatically selected by the user's device based on selection criteria. For example, the user's device can send the flight information through the onboard network system (ONS) to the internet, an intranet, or other physical or wireless connection (USB, BLUETOOTH, etc.).

Flight information can be entered into the user's device by the user manually typing, writing, voice or by using a camera connected to the user's device to take images of data displayed on the aircraft displays. The images are stored on the user's device and optical recognition methods are used to extract flight information that is used to update the current and predicted flight information.

Additionally, flight information, including user notes, are recorded with a selected level of significance such as "personal," "current flight only," "unofficial," "official," etc. This flight information indicates the applicability of the annotated information so as to assist in determining the relevance of information to other users. The user's device can provide the user with the ability to enter different types of flight information and synchronize the flight information on the user device as well as across the system.

Referring to FIG. 1, the flight object services component 120 of the ground server 105 is configured to automatically capture and compile current and predicted flight information and user notes in real time and automatically make that flight information available to a computing device running mobile application 150 to update the original filed flight plan. The mobile application 150 also provides the ability to update flight plan values in multiple ways (such as using an ONS).

In one illustrative example, a flight plan includes an estimated time to reach a waypoint. When the aircraft actually crosses the waypoint, the event is captured by flight object services component 120 of ground server 105. The flight object services component 120 determines the actual crossing time and invokes air/ground message service 122 to generate and send a message including the actual crossing time to the user's computing device executing mobile application 150 as well as flight object services 120 of ground server 105. The actual crossing time can be displayed and recorded automatically on the user's computing device by mobile application 150, and an update to the original flight plan is generated and made available for viewing on the user's computing device 515.

Flight information is sent to the pilot's computing device through one or more of the available communication channels such as the Internet, an intranet, or other physical or wireless connection (USB, BLUETOOTH, etc.). For example, with reference to FIG. 5, ground server 105 is included in ground service 530 and the generated message including the actual crossing time is transmitted via the internet 140 and to COMM manager/radio 550 on the aircraft 500. The COMM manager/radio 550 then transmits the message via router/access point 525 to the pilots' computing device such as device 515. Ground service 530 can include servers 534, 535, and 538, and mobile device 539, that are communicatively coupled via network 537. Ground service 530 can implement one or more functions depicted for ground server 105 in FIG. 1.

Additionally, flight information can be entered into the user's computing device manually, by voice, or by using a camera connected to the device to take images of data displayed on the aircraft displays. For example, the pilot's computing device 515 may have a camera function, or an interface where a camera device can attach and transfer image information to the computing device 515 using USB, BLUETOOTH, etc. The images are stored on the user's computing device 515 directly and analyzed to determine information relevant to the flight information. For example, the pilot captures an image of a display that includes flight information using a camera function on the user's computing device 515. The user's computing device 515 can invoke a function on the mobile application 150 running on the user's computing device 515 that implements an optical recognition algorithm that analyzes the captured image and extract flight-related information. This flight information can be sent to ground service 530 of FIG. 5 via router/access point 525, COMM manager/radio 550, and the internet 540. Ground service 530 that includes flight object services 120 running on ground server 105 then automatically updates the original filed flight plan with current and predicted flight information.

In at least one embodiment, flight information and user notes are recorded with various levels of significance such as "personal," "current flight only," "unofficial," "official," that are selected on the user's computing device running mobile application 150. This may be particularly advantageous when the flight crew needs to make unofficial notes, comments, or observations that may only be pertinent to other crew members of that flight and during that flight. One illustrative example is when one crew is waking from crew rest and handing-off the current status of the flight to the next crew. During this process, the new crew may be presented with "current flight only" or "unofficial" flight information and personal observations that are only pertinent to the current flight and the current status update.

Flight information, including user notes, that are labeled as "current flight only," "unofficial," or "personal" are stored locally on the user's computing device 515 and deleted with the proper authorization. Flight information, including user notes, are elevated to a significance level of "official" for storage and viewing by the entire company or authorized individuals. Official comments are recorded as an official communiqué of the flight. Identifying the unofficial and official communiqués of a flight can be done in an automated fashion based on the type of flight information or personal observations and how they were recorded. For example, all footage captured on a particular video camera onboard the aircraft may be recorded, given an "official" significance, and saved for flight history purposes. Likewise, voice recordings triggered by the crew may automatically be given an "unofficial" significance, but may be elevated to an "official" significance automatically if a particular phrase is recorded, an emergency detected, or some other important event occurs.

Figure 11:
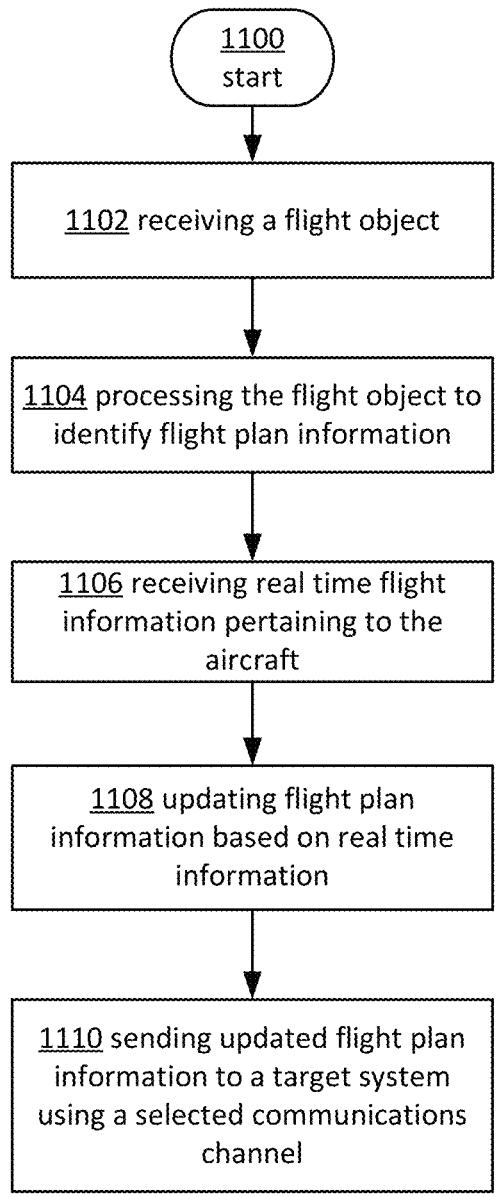
FIG. 11 is a flowchart depicting an example procedure for providing flight plan information to a user as implemented by the efficiency and operational flight object system.

FIG. 11 illustrates an example operational procedure for providing flight information to a user that can be executed on one or more components of ground server 105, web application 140, or mobile application 150 of FIG. 1. Referring to FIG. 11, operation 1100 begins the operational procedure. Operation 1102 is the step of receiving, by a first computing device configured with an efficiency and operational flight object system, a flight object via a communication network communicatively coupled to the first computing device. Operation 1104 is the step of processing the flight object to identify flight plan information pertaining to a planned flight associated with an aircraft. Operation 1106 is the step of receiving, by the first computing device, real time flight information pertaining to the aircraft as the aircraft conducts the planned flight.

Operation 1108 is the step of, based on the real time flight information, updating the flight plan information contained in the flight object. Operation 1110 is the step of sending the updated flight plan information to a target system using a selected one of a plurality of communications channels based on selection criteria.

Flight Path Discontinuities

A flight plan may be incomplete or incompatible with an FMC, a particular aircraft, or other subscriber. Each system that works with flight plans has its own state space, and a flight plan may be consistent and continuous internally to its own system, but when an attempt is made to translate the flight plan in another system, discontinuities may result. A discontinuity may be any flight information gap such that one part of a flight object does not logically and continuously relate back to a previous or next part of a flight object. Without additional flight plan processing instructions, manual intervention may be required to link the incomplete or incompatible parts of a flight plan. Without these links, the discontinuities can cause issues such as flight inefficiencies, increased workload, and even flying along the wrong course. Discontinuities in the flight plan can occur in all phases of flight (e.g., climb, cruise, descent) and may vary depending on FMC, aircraft type, or other subscriber restrictions.

In at least one embodiment, the efficiency and operational flight object system includes functionality that automatically generates flight plans, secondary, or alternate flight plans for a subscriber, where the generated flight plans are free of discontinuities. The efficiency and operational flight object system determines if and where discontinuities exist in a flight plan. If discontinuities exist, the discontinuities are automatically removed and a discontinuity-free flight plan is generated based on the communication protocol for the subscriber.

In an example, if a discontinuity is identified the efficiency and operational flight object system is configured to perform the following steps:
1. The discontinuity is identified in the flight plan;
2. Limitations are identified applicable to the end user's system and the source;
3. A navigational database is accessed to determine known waypoints that can be used to remove the discontinuity;
4. Create unique waypoint and maneuver instructions specific to each aircraft type, and FMC; and
5. Determine real time operational restrictions, and subscriber preference, to generate specific communications protocols to invoke a flight information message free from discontinuities for the end user's system.

Figure 8:
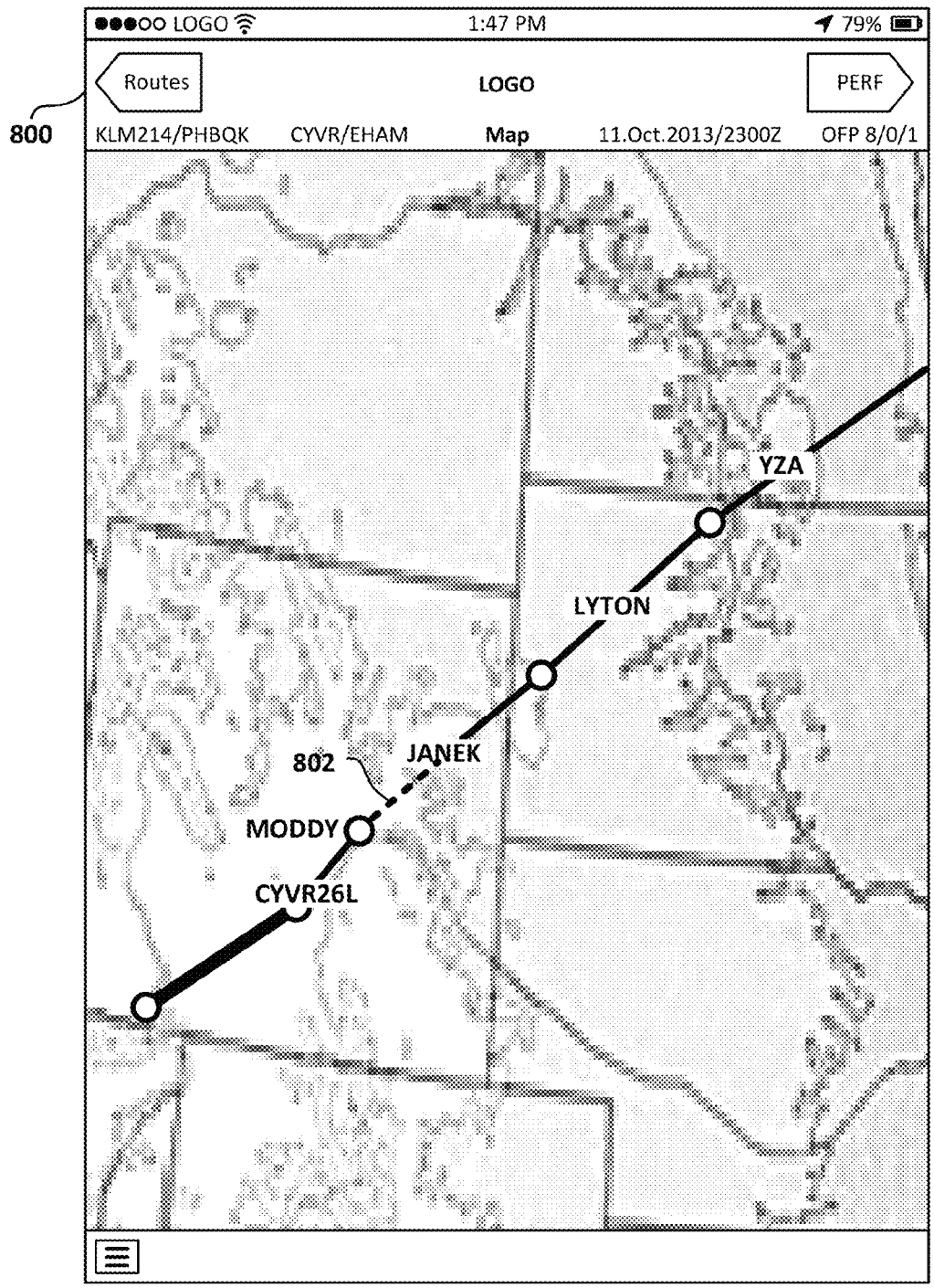
FIG. 8 depicts an example user interface that displays flight data on a global map using a computing device executing the mobile application.

With reference to FIG. 1, the flight object services component 120 of ground server 105 is configured to automatically generate flight plans, secondary, or alternate flight plans for a subscriber, where the generated flight plans are free of discontinuities. Referring to FIG. 8, the dotted line 802 showing the route from MODDY to JANEK represents a discontinuity when no guidance is available as to how to fly between those points. A flight plan can be loaded and sent to the flight object services component 120, which invokes flight plan processor 126 to parse the flight plan from the flight information. The flight plan processor 126 invokes the trajectory predictor processor 121. Trajectory predictor processor 121 is configured to determine if discontinuities exist in a flight plan. If discontinuities exist, trajectory predictor processor 121 is configured to automatically remove the discontinuity. The trajectory predictor processor 121 can, for example, invoke navigation database processor 123 which accesses a navigational database to retrieve specific waypoints, procedures and airways that can be used to remove the discovered discontinuity. The trajectory predictor processor shares the waypoints, procedures and airways that would remove the discontinuity with the flight plan processor 126. The flight plan processor 126 will verify that the flight plan is free from discontinuities and add unique waypoints, delete waypoints or provide guidance commands to remove any remaining discontinuities that could not be removed from the addition of known waypoints.

In another embodiment, discontinuities are created and added to a flight plan. Adding discontinuities to a flight plan can be useful for some scenarios involving ATC restrictions, minimize pilot training, or to place emphasis an area requiring additional pilot focus (e.g., transition to approach). By creating and adding discontinuities in a flight plan, an action is created for the pilot to approve. In some embodiments, discontinuities may be added and remove in the same flight plan. For example, a configuration may require adding discontinuities for the departure procedures, but removing all discontinuities from the arrival procedures.

Figure 12:
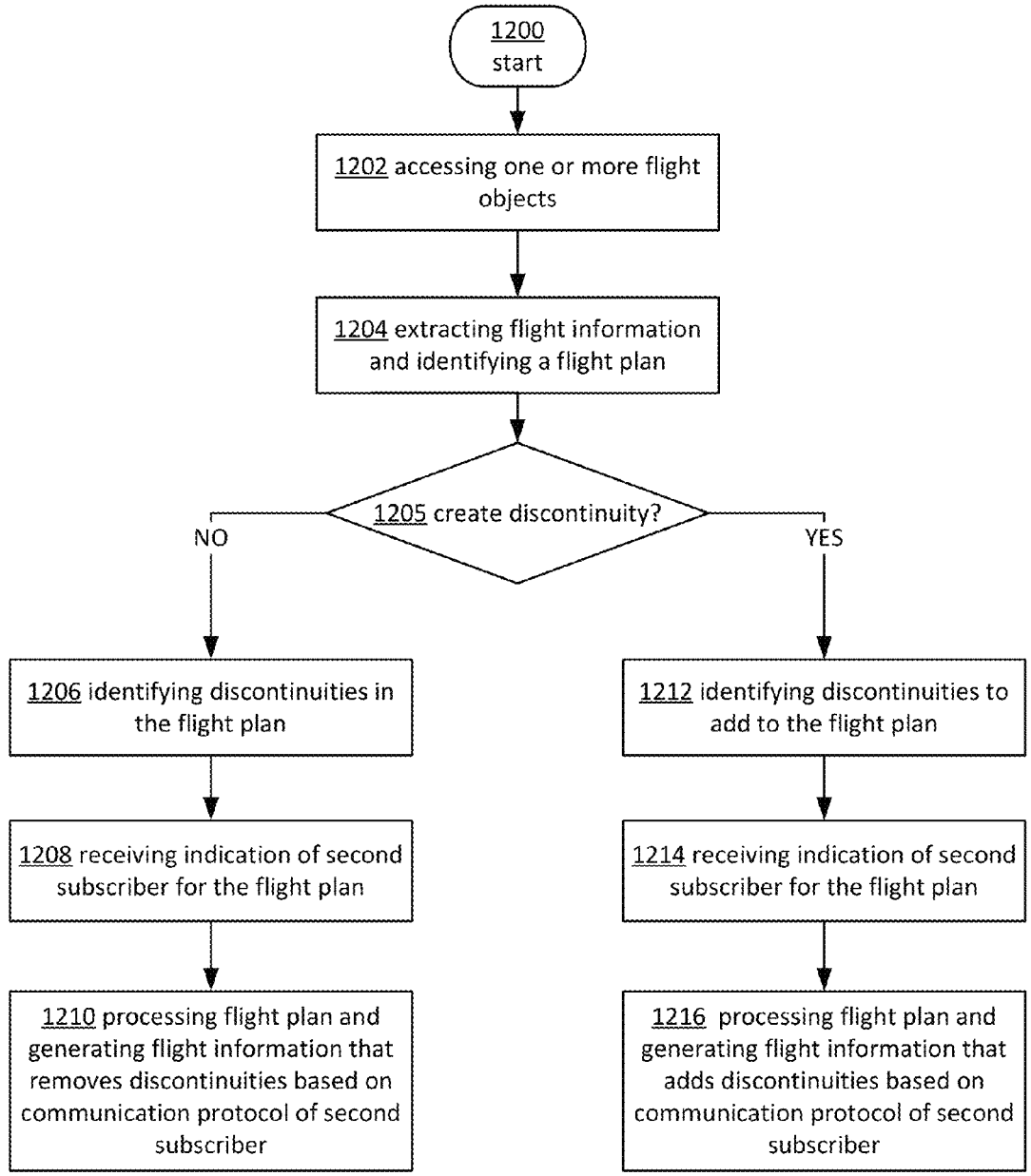
FIG. 12 is a flowchart depicting an example procedure for closing flight plan discontinuities as implemented by the efficiency and operational flight object system.
Figure 13:
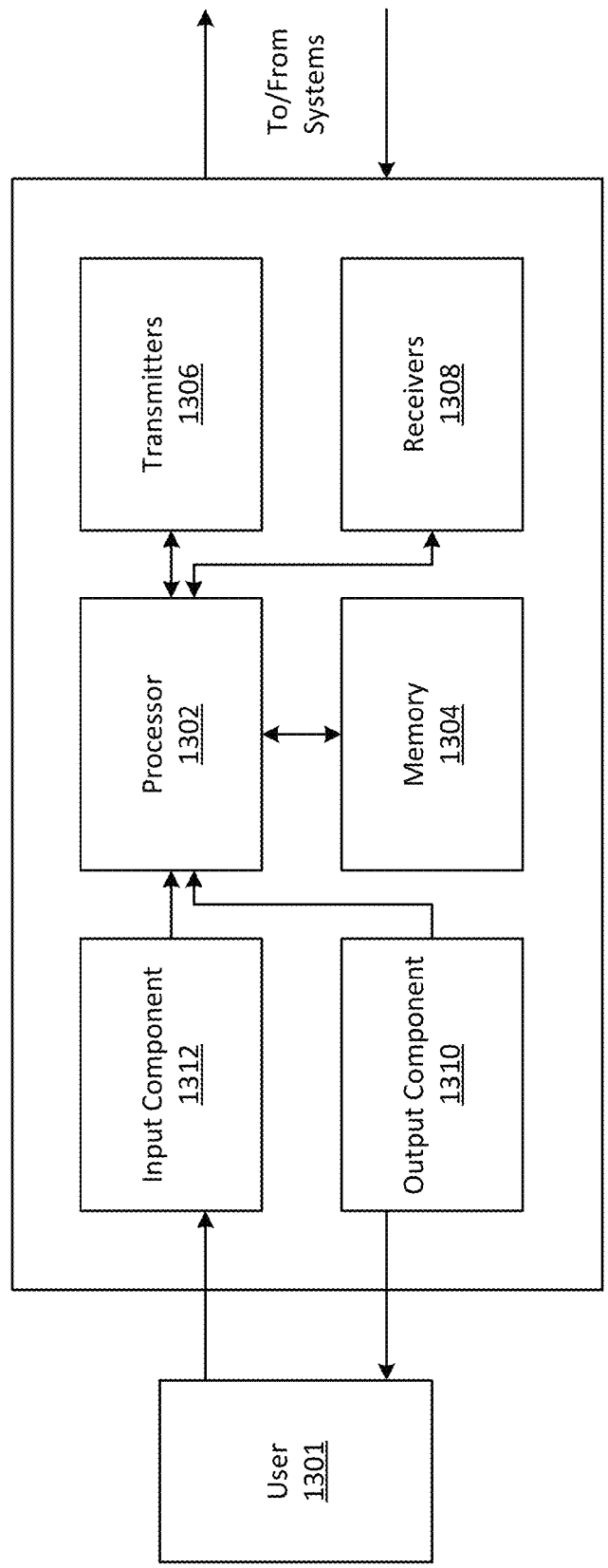
FIG. 13 depicts an example computing system that can be used to implement the systems shown in FIG. 1.

FIG. 12 illustrates an example operational procedure for closing flight plan discontinuities that can be executed on one or more components of ground server 105, web application 140, or mobile application 150 of FIG. 1. Referring to FIG. 12, operation 1200 begins the operational procedure. Operation 1202 is the step of accessing one or more flight objects on a computing device configured with the efficiency and operational flight object system. Operation 1204 is the step of extracting flight information from the one or more flight objects and identifying a flight plan in the flight information. The flight plan can be associated with a first subscriber. Operation 1205 is the step of determining if a discontinuity is to be created or removed. If a discontinuity is to be removed, then operation 1205 is followed by operation 1206, which is the step of identifying one or more discontinuities that can be removed from the flight plan. Operation 1208 is the step of receiving an indication of a second subscriber for the flight plan. Operation 1210 is the step of using the flight plan, generating flight information that removes the one or more discontinuities, based at least in part on a communication protocol associated with the second subscriber. If a discontinuity is to be created and added, then operation 1205 is followed by operation 1212, which is the step of identifying one or more discontinuities that can be added to the flight plan. Operation 1214 is the step of receiving an indication of a second subscriber for the flight plan. Operation 1216 is the step of generating flight information that includes the discontinuities, based at least in part on a communication protocol associated with the second subscriber.

Figure 14:
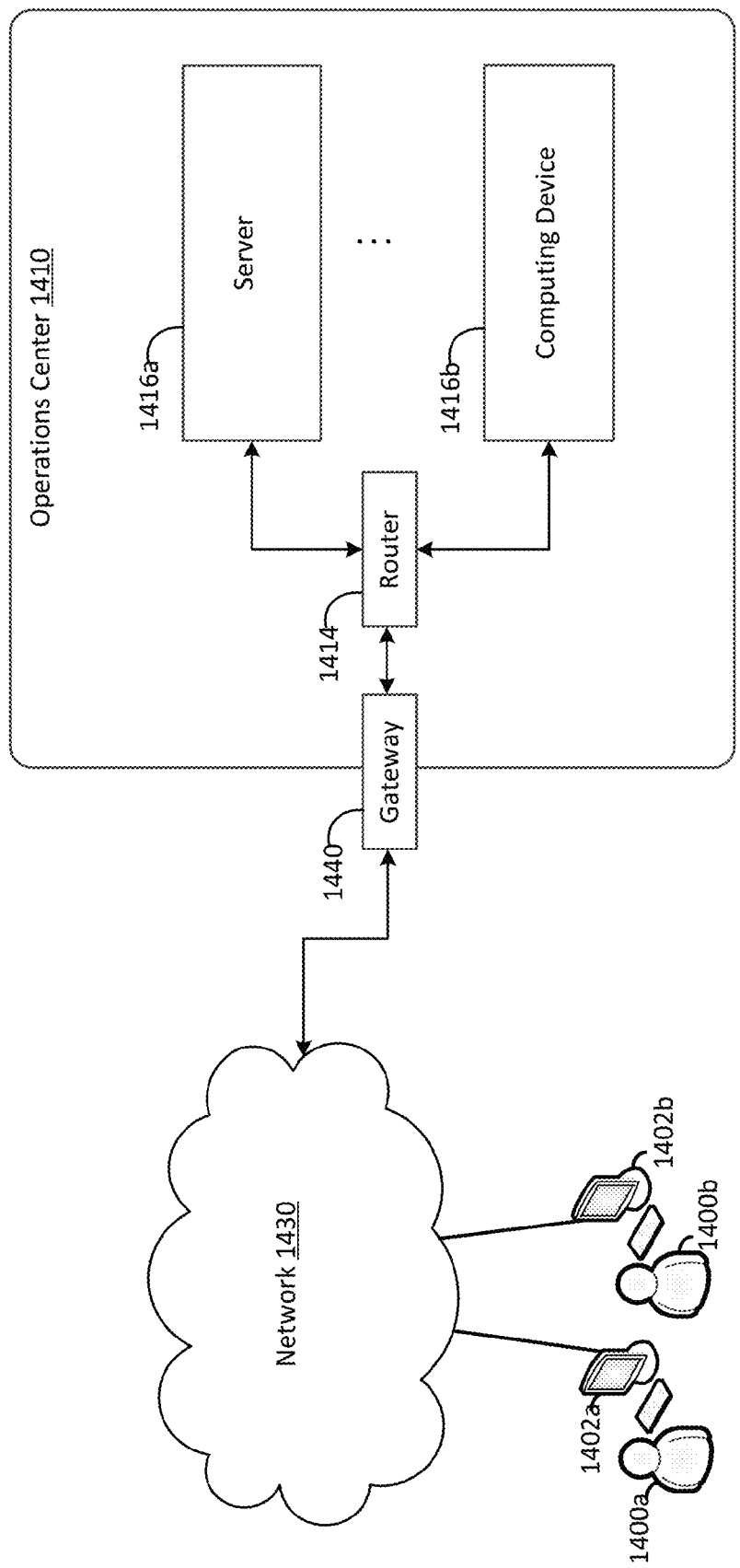
FIG. 14 depicts an example network and computing system that can be used to implement the systems shown in FIG. 1.

In at least some embodiments, a computing device that implements a portion or all of one or more of the technologies described herein, may include a general purpose computer system that includes or is configured to access one or more computer-accessible media. FIG. 14 illustrates such a general purpose computing device that can be used to execute one or more components that are depicted in FIG. 1. For example, web application 140 or mobile application 150 is loaded and run on such a general purpose computing device. In one example, a computing device includes a processor 1302, a memory device 1304 coupled to processor 1302, one or more wireless transmitters 1306, one or more wireless receivers 1308, an output component 1310, and an input component 1312.

Processor 1302 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are not intended to limit in any way the definition and/or meaning of the term "processor."

Memory device 1304 includes a non-transitory computer-readable storage medium, such as, without limitation, random access memory (RAM), flash memory, a hard disk drive, a solid state drive, a diskette, a Flash drive, a compact disc, a digital video disc, and/or any suitable memory. In the embodiment, memory device 1304 includes data and/or instructions embodying aspects of the disclosure that are executable by processor 1302 (e.g., processor 1302 may be programmed by the instructions) to enable processor 1302 to perform the functions described herein. Additionally, the memory device 1304 comprises an operation system and applications.

Wireless transmitters 1306 are configured to transmit control signals and data signals over the network communicating efficiency and operational flight object system 100 (FIG. 1). In one example, wireless transmitters 1306 transmits in a radio frequency spectrum and operate using an appropriate communication protocol. Each wireless transmitter 1306 operates on a particular radio frequency channel or a plurality of channels.

Wireless receivers 1308 are configured to receive control signals and data signals over the network communicating efficiency and operational flight object system 100 (FIG. 1). In one example, wireless receivers 1308 receive signals on a radio frequency spectrum. Each wireless receiver 1308 receives signals on a particular radio frequency channel or a plurality of channels.

The efficiency and operational flight object system 100 also includes at least one output component 1310 for presenting information to a user 1301. Output component 1310 may be any component capable of conveying information to user 1301. In at least one embodiment, output component 1310 includes an output adapter, such as a video adapter and/or an audio adapter or the like. An output adapter is operatively coupled to processor 1302 and is configured to be operatively coupled to an output device, such as a display device (e.g., a liquid crystal display (LCD), organic light emitting diode (OLED) display, cathode ray tube (CRT), "electronic ink" display, or the like) or an audio output device (e.g., a speaker, headphones, or the like). In at least one embodiment, one such display device and/or audio device is included with output component 1310.

The efficiency and operational flight object system 100 also includes at least one input component 1312 for receiving input from user 1301. Input component 1312 may include, for example, a keyboard, a pointing device, a mouse, a stylus, a touch sensitive panel (e.g., a touch pad or a touch screen), a gyroscope, an accelerometer, a position detector, an audio input device, or the like. A single component, such as a touch screen, may function as both an output device of output component 1310 and input component 1312. In at least one embodiment, output component 1310 and/or input component 1312 include an adapter for communicating data and/or instructions between the efficiency and operational flight object system 100 and a computer connected thereto.

FIG. 14 illustrates an example computing environment in which the embodiments described herein may be implemented. FIG. 14 is a diagram schematically illustrating an example of an operations center 1410, such as an airline operations center or an air traffic control operations center associated with other third party service providers. The operations center 1410 isaccessible by users 1400a and 1400b (which may be referred herein singularly as "a user 1400" or in the plural as "the users 1400") via user computers 1402a and 1402b (which may be referred herein singularly as "a computer 1402" or in the plural as "the computers 1402") via a network 1430.

Operations center 1410 includes servers 1416a and 1416b (which may be referred herein singularly as "a server 1416" or in the plural as "the servers 1416") that provide computing resources. Other resources that may be provided include data storage resources (not shown).

Network 1430 may, for example, be a publicly accessible network of linked networks and possibly operated by various distinct parties, such as the Internet, ACARS, or ATN. In other embodiments, network 1430 is a private network, such as, for example, a corporate network that is wholly or partially inaccessible to non-privileged users. In still other embodiments, network 1430 includes one or more private networks with access to and/or from the Internet.

Network 1430 may provide access to computers 1402. Computers 1402 may be computers utilized by users 1400. For instance, user computer 1402a or 1402b may be a server, a desktop or laptop personal computer, a tablet computer, a wireless telephone, a personal digital assistant (PDA), or any other computing device capable of accessing operations center 1410. User computer 1402a or 1402b may connect directly to the Internet (e.g., via a cable modem or a Digital Subscriber Line (DSL)). Although only two user computers 1402a and 1402b are depicted, it should be appreciated that there may be multiple user computers.

Computers 1402 may also be utilized to access the computing resources provided by operations center 1410. In this regard, operations center 1410 might provide a Web interface through which aspects of its operation may be accessed through the use of a Web browser application program executing on user computer 1402. Alternatively, a stand-alone application program executing on user computer 1402 might access an application programming interface (API) exposed by operations center 1410 for accessing the resources. Other mechanisms for accessing the resources of the operations center 1410, including deploying updates to an application, might also be utilized.

Server 1416a and computing device 1416b shown in FIG. 14 configured appropriately for providing the functionality described above.

In the example operations center 1410 shown in FIG. 14, a router 1414 may be utilized to interconnect the servers 1416a and 1416b. Router 1414 is also be connected to gateway 1440, which is connected to network 1430. Router 1414 manages communications within networks in operations center 1410, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 14 has been greatly simplified and that many more networks and networking devices may be utilized to interconnect the various computing systems disclosed herein. These network topologies and devices should be apparent to those skilled in the art.

It should also be appreciated that operations center 1410 described in FIG. 14 is merely illustrative and that other embodiments might be utilized. Additionally, it should be appreciated that the embodiments disclosed herein might be implemented in software, hardware or a combination of software and hardware. Other embodiments should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, Internet appliances, and various other products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will be appreciated that, while various items are illustrated as being stored in memory or on storage while being used, these items or portions of them may be transferred between memory and other storage devices. Alternatively, in other examples some or all of the software modules and/or systems may execute in memory on another device and communicate with the illustrated computing systems via inter-computer communication. In some examples, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

It will be appreciated that in some examples the functionality provided by the routines discussed above may be provided in alternative ways, such as being split among more routines or consolidated into fewer routines. Similarly, in some examples, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other examples the operations may be performed in other orders and in other manners. Similarly, the data structures discussed above may be structured in different ways in other examples, such as by having a single data structure split into multiple data structures or by having multiple data structures consolidated into a single data structure, and may store more or less information than is described (e.g., when other illustrated data structures instead lack or include such information respectively or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. The example systems and components described herein may be configured differently than described. For example, elements may be added to, removed from, or rearranged compared to the disclosed examples.

Various embodiments of the disclosed subject matter can be implemented as follows:

Automated Flight Object Procedure Selection System

1. A method of generating flight information in real time, comprising:
receiving flight information indicative of one or more flight objects on a computing device configured with an efficiency and operational flight object function;
extracting the flight information from the one or more flight objects and rendering the flight information for viewing;
receiving a flight plan entry associated with the flight information;
determining optimized and efficiency flight plan routing, fuel loading, departure, arrival, and approach procedure flight information based on the flight plan entry;
generating an optimized and efficiency flight plan routing, fuel loading, departure, arrival, and approach procedure flight information advisory; and
rendering the optimized and efficiency flight plan routing, fuel loading, departure, arrival, and approach procedure flight information advisory for viewing.

2. The method of claim 1, further comprising providing a user interface option to initiate selection of the optimized and efficiency flight plan routing, fuel loading, departure, arrival, and approach procedure flight information advisory.

3. The method of claim 1, wherein the procedures include runway, standard instrument departure, standard instrument departure transitions, standard terminal arrival procedure, standard terminal arrival procedure transition, approach and approach transition procedure.

4. The method of claim 1, further comprising providing at least one suggested procedure when none of the one or more procedures are in the current flight plan.

5. The method of claim 4, further comprising providing an option to accept the at least one suggested procedure or request another suggestion.

6. The method of claim 4, wherein the at least one suggested procedure is configurable.

7. A computing device for managing flight information in real time, the computing device comprising at least a processor and memory, the memory having stored thereon computer executable instructions that, when executed by the at least one processor, cause the device to at least:
receiving flight information indicative of one or more flight objects via at least one network communicatively coupled to the computing device;
extracting the flight information from the one or more flight objects and rendering the flight information for viewing;
receiving a flight plan entry associated with the flight information;
determining optimized and efficiency flight plan routing, fuel loading, departure, arrival, and approach procedure flight information based on the flight plan entry;
generating an optimized and efficiency flight plan routing, fuel loading, departure, arrival, and approach procedure flight information advisory; and
rendering the optimized and efficiency flight plan routing, fuel loading, departure, arrival, and approach procedure flight information advisory for viewing.

8. The computing device of claim 7, wherein the one or more flight objects comprise flight information for a planned flight.

9. The computing device of claim 7, wherein the target system comprises one of a flight management computer or a system of a service provider.

10. The computing device of claim 7, further comprising computer executable instructions that, when executed by the at least one processor, cause the device to at least store and modify the one or more flight objects.

11. The computing device of claim 7, wherein the one or more flight objects comprise flight information of one or more procedures, and wherein the flight object processing function provides an option to search the one or more procedures to determine if any are pertinent to a current flight plan associated with the one or more flight information objects.

12. A system comprising at least a processor and memory, the memory having stored thereon computer executable instructions that, when executed by the at least one processor, cause the system to:
receiving data indicative of one or more flight objects via at least one network communicatively coupled to the system;

extracting flight information from the one or more flight objects and rendering the flight information for viewing;

receiving a flight plan entry associated with the flight information;

determining optimized and efficiency flight plan routing, fuel loading, departure, arrival, and approach procedure flight information based on the flight plan entry;

generating an optimized and efficiency flight plan routing, fuel loading, departure, arrival, and approach procedure flight information advisory; and rendering the optimized and efficiency flight plan routing, fuel loading, departure, arrival, and approach procedure flight information advisory for viewing.

13. The system of claim 12, further comprising computer executable instructions that, when executed by the at least one processor, cause the system to at least provide at least one suggested procedure when none of the one or more procedures are in the current flight plan.

14. The system of claim 12, further comprising computer executable instructions that, when executed by the at least one processor, cause the system to at least provide an option to accept the at least one suggested procedure or request another suggestion.

Flight Object Communications System

1. A method of dynamically changing, communicating and synchronizing flight information between a plurality of systems, the method comprising:

receiving, on a computing device, flight information indicative of one or more flight objects, the computing device configured with an efficiency and operational flight object system;

extracting flight information from the one or more flight objects and rendering the flight information for viewing and editing along with real time flight information;

receiving modifications to the flight information and generating updates to the one or more flight objects;

tracking flight information changes applicable to one or more subscriber systems; storing user notes associated with the flight information changes;

generating flight information messages representative of the updated flight information and user notes that are compatible with one or more subscriber systems; and communicating the generated flight information messages to the one or more subscriber systems across the one or more networks.

2. The method of claim 1, wherein the one or more flight information messages are uploaded from the mobile computing device to a flight management computer via at least one server associated with a flight object service provider.

3. The method of claim 2, wherein the efficiency and operational flight object system includes the functionality of at least one server associated with the flight object service provider.

4. The method of claim 1, further comprising rendering the one or more flight objects on a user interface of the computing device and receiving, via at least one input mechanism of the computing device, flight information indicative of a modification to the one or more flight objects.

5. The method of claim 4, further comprising receiving, via at least one input mechanism of the computing device, flight information indicative one or more user notes to the one or more flight objects.

6. The method of claim 4, wherein the at least one input mechanism comprises one or more of a soft key mechanism, a hard key mechanism, an audio input mechanism, and an image capture mechanism.

7. A computing device for managing flight information in real time, the device comprising at least a processor and memory, the memory having stored thereon computer executable instructions that, when executed by the at least one processor, cause the device to at least:

store, on a computing device, flight information indicative of one or more flight objects, the computing device configured with an efficiency and operational flight object system;

extract flight information from the one or more flight objects and rendering the flight information for viewing and editing on a display coupled to the computing device along with real time flight information;

receive modifications to the flight information via an input device coupled to the computing device;

tracking flight information changes applicable to one or more subscriber systems;

storing user notes associated with the flight information changes;

and communicate the modifications via the one or more networks to a system configured to:

generate updates to the one or more flight objects based on the modifications;

generate flight information messages representative of the updated flight objects that are compatible with the one or more subscriber systems; and communicate the generated flight information messages to the one or more subscriber systems.

8. The computing device of claim 7, wherein the one or more flight objects are communicated from the computing device to the flight management computer via at least one server associated with a flight object service provider.

9. The computing device of claim 8, wherein the flight object modification and distribution function includes the functionality of the at least one server associated with the flight object service provider.

10. The computing device of claim 8, further comprising rendering the one or more flight objects on a user interface of the computing device and receiving, via at least one input mechanism of the computing device, flight information indicative of a modification to the one or more flight objects.

11. The method of claim 10, further comprising receiving, via at least one input mechanism of the computing device, data indicative one or more user notes to the one or more flight objects.

12. The method of claim 10, wherein the at least one input mechanism comprises one or more of a soft key mechanism, a hard key mechanism, an audio input mechanism, and an image capture mechanism.

13. A system comprising at least a processor and memory, the memory having stored thereon computer executable instructions that, when executed by the at least one processor, cause the system to:

store, on a computing device, flight information indicative of one or more flight objects, the computing device configured with an efficiency and operational flight object system;

extract flight information from the one or more flight objects and rendering the flight information for viewing and editing on a display coupled to the computing device along with real time flight information;

receive modifications to the flight information via an input device coupled to the computing device;

tracking flight information changes applicable to one or more subscriber systems; storing user notes associated with the flight information changes; and communicate the modifications via the one or more networks to a system configured to:

generate updates to the one or more flight objects based on the modifications;

generate messages representative of the updated flight objects that are compatible with the one or more subscriber systems; and communicate the generated messages to the one or more subscriber systems.

14. The system of claim 13, wherein the one or more flight objects are communicated from the mobile computing device to the flight management computer via at least one server associated with a flight object service provider.

15. The system of claim 14, wherein the mobile flight planning/processing function includes the functionality of the at least one server associated with a flight object service provider.

16. The system of claim 13, further comprising rendering the one or more flight objects on a user interface of the mobile computing device and receiving, via at least one input mechanism of the mobile computing device, data indicative of a modification to the one or more flight objects.

17. The system of claim 16, further comprising receiving, via at least one input mechanism of the mobile computing device, data indicative one or more annotations to the one or more flight objects.

18. The system of claim 16, wherein the at least one input mechanism comprises one or more of a soft key mechanism, a hard key mechanism, an audio input mechanism, and an image capture mechanism.

Flight Analogous and Projection System

1. A method of generating projected flight information, the method comprising:

inputting one or more flight objects to a computing device configured with an efficiency and operational flight object system;

extracting active flight information from the one or more flight objects and rendering the active flight information for viewing;

identifying flight information data that is analogous to the active flight information;

receiving, via at least one input mechanism of the mobile computing device, a selection of at least a portion of the analogous flight information data; and based on the selected analogous flight information data, generating a projection of the analogous flight information on the active flight information.

2. The method of claim 1, further comprising receiving, via the at least one input mechanism of the computing device, flight information indicative of one or more hypothetical conditions, and generating the projection based in part on the one or more hypothetical conditions.

3. The method of claim 1, wherein the flight information comprises real time and historical flight information for similar flights and historical data for a concurrent flight.

4. The method of claim 1, wherein the analogous flight information are configurable by similar route, speeds, altitude, aircraft type, date range, origin, destination, departure time, arrival time, tail number, pilot's name, or flight number of one or more airline operators.

5. The method of claim 1, further comprising receiving, via the at least one input mechanism of the mobile computing device, flight information indicative of a modification to the one or more flight objects.

6. The method of claim 5, further comprising communicating, via at least one network, the modified one or more flight objects for transmission to a target system.

7. The method of claim 1, wherein the one or more flight objects comprise a plurality of flight information comprised of flight plans.

8. The method of claim 1, further comprising rendering the one or more flight objects on a user interface of the computing device.

9. The method of claim 8, further comprising generating advisories indicating discrepancy areas.

10. A computing device for generating projected flight information, the device comprising at least a processor and memory, the memory having stored thereon computer executable instructions that, when executed by the at least one processor, cause:

inputting one or more flight objects to a computing device configured with an efficiency and operational flight object system;

extracting active flight information from the one or more flight objects and rendering the active flight information for viewing;

identifying flight information that is analogous to the active flight information;

receiving, via at least one input mechanism of the mobile computing device, a selection of at least a portion of the analogous flight information; and based on the selected analogous flight information, generating a projection of the analogous flight information on the active flight information.

11. The computing device of claim 10, further comprising computer executable instructions that, when executed by the at least one processor, cause the device to at least receive, via the at least one input mechanism of the computing device, flight information indicative of one or more hypothetical conditions, and determining the projection based in part on the one or more hypothetical conditions.

12. The computing device of claim 10, wherein flight information comprises real time and historical data for similar flights and historical data for a concurrent flight.

13. The computing device of claim 10, wherein the analogous flight information are configurable by similar route, speeds, altitude, aircraft type, date range, origin, destination, departure time, arrival time, tail number, pilot's name, or flight number of one or more airline operators.

14. The computing device of claim 13, further comprising computer executable instructions that, when executed by the at least one processor, cause the device to at least receive, via the at least one input mechanism of the mobile computing device, flight information indicative of a modification to the one or more flight objects.

15. The computing device of claim 13, further comprising computer executable instructions that, when executed by the at least one processor, cause the computing device to at least communicate, via at least one network, the modified one or more flight objects for transmission to a target system.

16. A system comprising at least a processor and memory, the memory having stored thereon computer executable instructions that, when executed by the at least one processor, cause:

inputting one or more flight objects to a computing device configured with an efficiency and operational flight object system;

extracting active flight information from the one or more flight objects and rendering the active flight information for viewing;

identifying flight information that is analogous to the active flight information;

receiving, via at least one input mechanism of the mobile computing device, a selection of at least a portion of the analogous flight information; and based on the selected analogous flight information, generating a projection of the analogous flight history data on the active flight information.

17. The system of claim 16, wherein the one or more flight objects comprise a plurality of flight plans.

18. The system of claim 16, further comprising computer executable instructions that, when executed by at least one processor, cause the system to render the one or more flight objects on a user interface of the computing device.

19. The system of claim 16, further comprising computer executable instructions that, when executed by the at least one processor, cause the system to render a graphical depiction of an active flight plan associated with the one or more flight objects.

20. The system of claim 16, wherein the flight information comprises real time and historical data for similar flights and historical data for a concurrent flight.

Aircraft Performance Predictions

1. A method of generating predicted flight plan information, the method comprising:

accessing one or more flight objects on a computing device configured with an efficiency and operational flight object system, the one or more flight objects accessed via at least one network communicatively coupled to the computing device, the one or more flight objects associated with a planned flight;

extracting flight information from the one or more flight objects, processing and rendering the active flight information for viewing;

receiving, via at least one input mechanism of the computing device, one or more filtering criteria pertaining to the planned flight;

determining flight information pertaining to the planned flight and associated airspace environment information based on the filtering criteria;

generating event probability and forecast predictions for the planned flight based on the determined flight information; and generating predictive flight information with user notes and aircraft performance information using the generated event probability and forecast predictions.

2. The method of claim 1, wherein the flight information comprises one or more of flight history information, flight actuals, planned flight information, user notes and advisory information; current planned flight; flight history, flight events, predicted performance, weather, environmental conditions, or flight trajectory information.

3. The method of claim 1, wherein the predictive flight information includes aircraft performance information and a probability distribution function.

4. The method of claim 1, further comprising receiving, via at least one input mechanism of the computing device, changes to the one or more filtering criteria pertaining to the planned flight and updating the generated predictive flight information with user notes and aircraft performance information in response to flight information changes.

5. The method of claim 2, wherein a time period for the flight information is selectable via at least one input mechanism of the computing device.

6. The method of claim 2, wherein the flight information includes pilots' notes.

7. The method of claim 2, wherein the flight information includes real time, forecast and flight predicted environmental conditions.

8. The method of claim 1, wherein the event probability and predictions are determined based on historical, real time and planned flight information, and business considerations.

9. The method of claim 1, wherein the event probability and forecast predictions includes one or more of predicted fuel at selected waypoints, and a probability of a hold.

10. The method of claim 7, wherein the user notes are categorized with levels of significance of the respective annotation.

11. A computing device for managing flight information in real time, the device comprising at least a processor and memory, the memory having stored thereon computer executable instructions that, when executed by the at least one processor, cause the device to at least:

access one or more flight objects on a computing device configured with an efficiency and operational flight object system, the one or more flight objects accessed via at least one network communicatively coupled to the computing device, the one or more flight objects associated with a planned flight;

extract flight information from the one or more flight objects, process and rendering the active flight information for viewing;

receive, via at least one input mechanism of the computing device, one or more filtering criteria pertaining to the planned flight;

determine the planned flight and associated airspace environment information based on the filtering criteria;

generate event probability and forecast predictions for the planned flight based on the determined flight information; and generate predictive flight information using user notes, aircraft performance information, and using the generated event probability and forecast predictions.

12. The computing device of claim 11, wherein the flight information comprises real time and flight history information.

13. The computing device of claim 11, wherein the flight information comprises flight plan and advisory information.

14. The computing device of claim 11, wherein the flight information comprises one or more of planned flight; flight history, flight events, predicted performance, weather, environmental conditions, or flight trajectory information.

15. The computing device of claim 11, wherein a time period for the flight information is selectable via at least one input mechanism of the computing device.

16. A system comprising at least a processor and memory, the memory having stored thereon computer executable instructions that, when executed by the at least one processor, cause the system to:

access one or more flight objects on a computing device configured with an efficiency and operational flight object system, the one or more flight objects accessed via at least one network communicatively coupled to the computing device, the one or more flight objects associated with a planned flight;

receive, via at least one input mechanism of the computing device, one or more filtering criteria pertaining to the planned flight;

determine flight information pertaining to the planned flight and associated airspace environment information based on the filtering criteria;

generate event probability and forecast predictions for the planned flight based on the determined flight information; and generate predictive aircraft performance information using the generated event probability and forecast predictions.

17. The system of claim 16, wherein the flight history information includes pilots' annotations.

Automatic Real-Time Flight Plan Updates

1. A method of providing flight plan information to a user, the method comprising:

receiving, by a first computing device configured with an efficiency and operational flight object system, a flight object via a communication network communicatively coupled to the first computing device;

processing the flight object to identify flight plan information pertaining to a planned flight associated with an aircraft;

receiving, by the first computing device, real time flight information pertaining to the aircraft as the aircraft conducts the planned flight;

based on the real time flight information, updating the flight plan information contained in the flight object; and sending the updated flight plan information to a target system using a selected one of a plurality of communications channels based on selection criteria.

2. The method of claim 1, wherein the real time flight information is associated with one or more indications of significance.

3. The method of claim 1, wherein the real time flight information comprises user notes.

4. The method of claim 3, wherein the user notes comprises one or more of flight events, personal comments, or operational requirements.

5. The method of claim 1, further comprising making the real time flight information and updated flight plan information available for viewing on the computing device.

6. The method of claim 1, wherein:

said real time flight information is sent from a system on-board the aircraft to an off-board system;

said updating the flight plan information is performed by the off-board system; and said providing the updated flight plan information to the first computing device is performed by the off-board system.

7. The method of claim 1, wherein:

the first computing device and a second computing device are on-board computing devices that are communicatively coupled;

said real time flight information is sent from a system on-board the aircraft to the first and second computing devices;

said updating the flight information is performed by the second computing device; and said providing the updated flight information to the first computing device is performed by the second computing device.

8. The method of claim 1, wherein the first computing device is a mobile computing device and the real time flight information is received manually from the user.

9. The method of claim 1, wherein the first computing device is a mobile computing device and the current and predicted flight information and user notes is received via an input mechanism on the mobile computing device.

10. The method of claim 9, wherein the input mechanism comprises an image capture device.

11. The method of claim 6, wherein the real time flight information is received using automatic dependent surveillance-broadcast (ADS-B).

12. The method of claim 1, wherein the real time flight information includes one or more of time sequencing of a waypoint, weather, turbulence, fuel on board, fuel at destination, and estimated time of arrival at the destination.

13. The method of claim 2, wherein the indications of significance comprises one or more of "personal," "current flight only," "unofficial," and "official."

14. A computing device configured to provide flight information to a user, the device comprising at least a display, a processor, and memory, the memory having stored thereon computer executable instructions that, when executed by the at least one processor, cause the device to at least:

receive a flight object via a communication network;

automatically compile real time flight information in real time, the information pertaining to an aircraft as the aircraft conducts a planned flight;

based on the real time flight information, updating flight plan information contained in the flight object; and sending the updated flight information to a target system using a selected one of a plurality of communications channels based on selection criteria.

15. The computing device of claim 14, wherein the updated flight information is received from another computing device communicatively coupled to the communication network.

16. The computing device of claim 14, wherein the updated flight information is received from an efficiency and operational flight object system executing on the computing device.

17. The computing device of claim 14, wherein the real time flight information comprises user notes 18. The computing device of claim 14, wherein the real time flight information is associated with one or more indications of significance.

19. A system comprising at least a processor and memory, the memory having stored thereon computer executable instructions that, when executed by the at least one processor, cause the system to:

receive a flight object via a communication network communicatively coupled to the system;

identify, from the flight object, flight information pertaining to a planned flight associated with an aircraft;

receive real time flight information pertaining to the aircraft with respect to the planned flight;

based on the real time flight information, updating the flight information contained in the flight object; and sending the updated flight information to a target system using a selected one of a plurality of communications channels based on selection criteria.

20. The system of claim 19, wherein the updated flight information is received from one of the computing devices communicatively coupled to the communication network.

21. The system of claim 19, wherein the real time flight information is associated with one or more indications of significance.

Flight Path Discontinuities

1. A method of adding or removing flight information discontinuities, the method comprising:

accessing one or more flight objects on a computing device configured with an efficiency and operational flight object system, the one or more flight objects communicated via at least one network coupled to the computing device;

extracting flight information from the one or more flight objects and identifying a flight plan in the flight information, the flight plan associated with a first subscriber;

identifying one or more discontinuities that can be added to the flight plan or removed from the flight plan;

receiving an indication of a second subscriber for the flight plan; and processing the flight plan and generating flight information that adds or removes the one or more discontinuities, based at least in part on a communication protocol associated with the second subscriber.

2. The method of claim 1, further comprising removing the one or more discontinuities from the flight plan.

3. The method of claim 1, further comprising adding the one or more discontinuities to the flight plan.

4. The method of claim 1, wherein the flight plan comprises at least an origin and destination.

5. The method of claim 1, further comprising rendering the generated flight information on a user interface of the computing device.

6. The method of claim 1, further comprising uploading, via at least one network, the flight information message for transmission to the second subscriber.

7. The method of claim 1, wherein the discontinuities comprise one or more of terminal or enroute procedures of a standard instrument departure, departure transition, enroute, standard terminal arrival route, arrival transitions, approaches and approach transitions.

8. A computing device configured to add or remove flight information discontinuities, the device comprising at least a processor and memory, the memory having stored thereon computer executable instructions that, when executed by the at least one processor, cause the device to at least:

access one or more flight objects received via at least one network coupled to the computing device;

identify a flight plan in the one or more flight objects;

determine a subscriber for the flight plan; and generate flight information that adds or removes one or more discontinuities based on the flight plan and a communication protocol associated with the subscriber.

9. The computing device of claim 8, wherein the flight plan includes a flight path comprising at least an origin and destination.

10. The computing device of claim 8, further comprising computer executable instructions that, when executed by the at least one processor, cause the device to at least render the generated flight information on a user interface of the computing device.

11. The computing device of claim 8, further comprising computer executable instructions that, when executed by the at least one processor, cause the device to at least upload, via the at least one network, the flight plan for transmission to a target system associated with the subscriber.

12. The computing device of claim 8, wherein the discontinuities comprise one or more of terminal or enroute procedures of a standard instrument departure, departure transition, enroute, standard terminal arrival route, arrival transitions, approaches and approach transitions.

13. A system comprising at least a processor and memory, the memory having stored thereon computer executable instructions that, when executed by the at least one processor, cause the system to:

access one or more flight objects received via at least one network coupled to the computing device;

extracting flight information from the one or more flight objects and identifying a flight plan in the flight information, the flight plan associated with a first subscriber;

identifying one or more discontinuities that can be added to or removed from the flight plan;

receiving an indication of a second subscriber for the flight plan; and processing the flight plan, generating flight information that includes or removes the one or more discontinuities, based at least in part on a communication protocol associated with the second subscriber.

14. The system of claim 13, wherein the flight plan comprises at least an origin and destination.

15. The system of claim 13, further comprising computer executable instructions that, when executed by the at least one processor, cause the system to at least render the generated flight information on a user interface of the system.

16. The system of claim 13, further comprising computer executable instructions that, when executed by the at least one processor, cause the system to at least upload, via the at least one network, the flight information for transmission to a target system associated with the subscriber.

17. The system of claim 13, wherein the discontinuities comprise one or more of terminal or enroute procedures of a standard instrument departure, departure transition, enroute, standard terminal arrival route, arrival transitions, approaches and approach transitions.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

What is claimed:

1. A method of dynamically changing, communicating and synchronizing flight information between a plurality of systems, the method comprising:

receiving, on a computing device, flight information indicative of one or more flight objects, the computing device configured with an efficiency and operational flight object system;

extracting flight information from the one or more flight objects and rendering the flight information for viewing and editing along with real time flight information;

receiving modifications to the flight information and generating updates to the one or more flight objects;

tracking flight information changes applicable to one or more subscriber systems;

storing user notes associated with the flight information changes;

generating flight information messages representative of the updated flight information and user notes that are compatible with one or more subscriber systems; and communicating the generated flight information messages to the one or more subscriber systems across the one or more networks.

2. The method of claim 1, wherein the one or more flight information messages are uploaded from the mobile computing device to a flight management computer via at least one server associated with a flight object service provider.

3. The method of claim 2, wherein the efficiency and operational flight object system includes the functionality of at least one server associated with the flight object service provider.

4. The method of claim 1, further comprising rendering the one or more flight objects on a user interface of the computing device and receiving, via at least one input mechanism of the computing device, flight information indicative of a modification to the one or more flight objects.

5. The method of claim 4, further comprising receiving, via at least one input mechanism of the computing device, flight information indicative one or more user notes to the one or more flight objects.

6. The method of claim 4, wherein the at least one input mechanism comprises one or more of a soft key mechanism, a hard key mechanism, an audio input mechanism, and an image capture mechanism.

7. A computing device for managing flight information in real time, the device comprising at least a processor and memory, the memory having stored thereon computer executable instructions that, when executed by the at least one processor, cause the device to at least:
store, on a computing device, flight information indicative of one or more flight objects, the computing device configured with an efficiency and operational flight object system;
extract flight information from the one or more flight objects and rendering the flight information for viewing and editing on a display coupled to the computing device along with real time flight information;
receive modifications to the flight information via an input device coupled to the computing device;
tracking flight information changes applicable to one or more subscriber systems; storing user notes associated with the flight information changes; and
communicate the modifications via the one or more networks to a system configured to: generate updates to the one or more flight objects based on the modifications;
generate flight information messages representative of the updated flight objects that are compatible with the one or more subscriber systems; and
communicate the generated flight information messages to the one or more subscriber systems.

8. The computing device of claim 7, wherein the one or more flight objects are communicated from the computing device to the flight management computer via at least one server associated with a flight object service provider.

9. The computing device of claim 8, wherein the flight object modification and distribution function includes the functionality of the at least one server associated with the flight object service provider.

10. The computing device of claim 8, further comprising rendering the one or more flight objects on a user interface of the computing device and receiving, via at least one input mechanism of the computing device, flight information indicative of a modification to the one or more flight objects.

11. The computing device of claim 10, further comprising receiving, via at least one input mechanism of the computing device, data indicative one or more user notes to the one or more flight objects.

12. The computing device of claim 10, wherein the at least one input mechanism comprises one or more of a soft key mechanism, a hard key mechanism, an audio input mechanism, and an image capture mechanism.

13. A system comprising at least a processor and memory, the memory having stored thereon computer executable instructions that, when executed by the at least one processor, cause the system to:
store, on a computing device, flight information indicative of one or more flight objects, the computing device configured with an efficiency and operational flight object system;
extract flight information from the one or more flight objects and rendering the flight information for viewing and editing on a display coupled to the computing device along with real time flight information;
receive modifications to the flight information via an input device coupled to the computing device;
tracking flight information changes applicable to one or more subscriber systems; storing user notes associated with the flight information changes; and
communicate the modifications via the one or more networks to a system configured to: generate updates to the one or more flight objects based on the modifications;
generate messages representative of the updated flight objects that are compatible with the one or more subscriber systems; and
communicate the generated messages to the one or more subscriber systems.

14. The system of claim 13, wherein the one or more flight objects are communicated from the mobile computing device to the flight management computer via at least one server associated with a flight object service provider.

15. The system of claim 14, wherein the mobile flight planning/processing function includes the functionality of the at least one server associated with a flight object service provider.

16. The system of claim 13, further comprising rendering the one or more flight objects on a user interface of the mobile computing device and receiving, via at least one input mechanism of the mobile computing device, data indicative of a modification to the one or more flight objects.

17. The system of claim 16, further comprising receiving, via at least one input mechanism of the mobile computing device, data indicative one or more annotations to the one or more flight objects.

18. The system of claim 16, wherein the at least one input mechanism comprises one or more of a soft key mechanism, a hard key mechanism, an audio input mechanism, and an image capture mechanism.

* * * * *